United States Patent
Sugiyama et al.

(10) Patent No.: US 6,278,827 B1
(45) Date of Patent: *Aug. 21, 2001

(54) LIGHT TRANSMISSION TUBES

(75) Inventors: Hideo Sugiyama; Masato Sugimachi, both of Tokyo; Minoru Ishiharada, Saitama; Yasuhiro Morimura, Tokyo; Tatsuo Terahama, Tokyo; Hiroshi Fukuyama, Tokyo; Itsuo Tanuma, Saitama, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/292,463

(22) Filed: Apr. 15, 1999

(30) Foreign Application Priority Data

| Apr. 20, 1998 | (JP) | 10-125264 |
| Jul. 24, 1998 | (JP) | 10-209751 |
| Jul. 24, 1998 | (JP) | 10-209752 |
| Jul. 24, 1998 | (JP) | 10-209753 |
| Jul. 24, 1998 | (JP) | 10-209754 |
| Jul. 24, 1998 | (JP) | 10-209755 |

(51) Int. Cl.[7] .............. G02B 6/00; F21V 7/04; F21V 8/00
(52) U.S. Cl. .......... 385/123; 385/126; 385/901
(58) Field of Search .......... 385/123, 128, 385/901, 147, 4, 133, 126, 127; 362/552

(56) References Cited

U.S. PATENT DOCUMENTS

| 4,733,332 | * | 3/1988 | Yamashita et al. | 363/32 |
| 5,903,695 | * | 5/1999 | Zarian et al. | 385/127 |
| 5,982,969 | * | 11/1999 | Sugiyama et al. | 385/123 |

FOREIGN PATENT DOCUMENTS

| 800036 A1 | * | 10/1997 | (EP) | 385/123 |
| 0 874 191 | | 10/1998 | (EP) . | |
| 1-197902 | * | 8/1989 | (JP) | 385/123 |

* cited by examiner

*Primary Examiner*—Jon Henry
(74) *Attorney, Agent, or Firm*—Kanesaka & Takeuchi

(57) ABSTRACT

A light transmission tube includes a tubular clad and a core section having a higher refractive index than that of the tubular clad. A belt-like reflecting layer is formed between the tubular clad and the core section, extending in the longitudinal direction of the tubular clad, in a manner such that a light passing through the core section is reflected and scatterred by the reflecting layer and then emitted from an outer surface area of the tubular clad, which outer surface area is located opposite to one side of the tubular clad where the reflecting layer has been formed. Further, the reflecting layer may be so formed that a light is allowed to be emitted in a plurality of directions. Moreover, the belt-like reflecting layer may be formed into a spiral configuration. The width of the belt-like reflecting layer may be changed in the longitudinal direction of the light transmission tube. The tubular clad is allowed to have a non-circular cross section. The clad formation material may contain an ultraviolet light shielding material or an ultraviolet light absorbing material.

17 Claims, 9 Drawing Sheets

LIGHT TRANSMISSION TUBES

BACKGROUND OF THE INVENTION AND RELATED ART STATEMENT

The present invention relates to light transmission tubes. Each of the light transmission tubes to which the present invention relates is comprised of a transparent tubular clad and a transparent core section having a higher refractive index than the transparent tubular clad. In particular, this invention relates to light transmission tubes each of which is capable of emitting a light having a predetermined directivity from one side of the clad (a part of its outer surface area).

In general, if a light transmission tube is comprised of a tubular clad and a core section having a higher refractive index than the tubular clad, a usually adopted method for the use of it is that a large amount of light be sent toward the front end of the light transmission tube. As a result, a brightness on the circumferential surface area of the light transmission tube is usually not very high. As a method for increasing the above brightness, it is allowable for people to consider forming some irregular convex and concave portions on the internal surface of the clad so as to improve the brightness on the circumferential surface area of the light transmission tube. However, if a light transmission tube has a structure which is formed by filling the internal space of the tubular clad with a liquid state polymerizable monomer (for forming the core section), followed by applying a pressure to effect a predetermined polymerization of the monomer, the formation of the irregular convex and concave portions on the internal surface of the clad will cause the clad to be easily broken, hence making it difficult to manufacture a light transmission tube in the above manner.

Further, it has been also suggested that a sort of particles having a desired light scatterring property be dispersed throughout the core section so as to increase the brightness on the circumferential surface area of the light transmission tube. However, although it has been suggested that the particles capable of light scatterring be at first dispersed in a liquid polymerizable monomer, then followed by a predetermined polymerization and solidification, there has not been suggested a method in which an amount of light scatterring particles be added in the liquid state monomer so that upon polymerization of the monomer the light scatterring particles may be dispersed or a light reflective layer may be formed in a desired manner.

In the past, as a light emitting tubular member capable of emitting a light along a length of about several meters, there had been in use a neon tube and a fluorescent tube. However, when using a neon tube or a fluorescent tube, since a high voltage is needed to be applied to a neon tube or a fluorescent tube, there is a danger that an electric shock or an electric leakage may happen. As a result, such a neon tube or a fluorescent tube can not be used under water, nor is it suitable for them to be used in a place where rain water or snow frequently enters. Further, since a neon tube or a fluorescent tube has been formed into a tubular shape, they do not have a desired impact resistance. For this reason, both a neon tube and a fluorescent tube failed to be used in a place where other objects such as people and vehicles might appear.

In order to solve the above problem, it has been suggested to use a light transmission tube which is a flexible tube filled with a transparent core liquid or a soft transparent polymer, or to employ a light transmission tube involving the use of a plastic material and an optical fiber. Each of the above suggested light transmission tubes is so formed that a light from a light source is allowed to be introduced into the tube through one end thereof and then this light is emitted from the circumferential surface of the tube along a length that may be several tens of meters. In this way, since a light source may be separated from a light emitting portion, the tube would have no danger of being broken. As a result, each of the above suggested light transmission tubes is suitable for use under water or in an outdoor environment or even in an environment which might involve a possibility of an explosion. Further, since each of the above suggested light transmission tubes is allowed to be manufactured without having to perform some troublesome treatment such as glass delicate treatment, a corresponding manufacturing process may be carried out with an improved efficiency.

On the other hand, with a light transmission tube which is comprised of a transparent tubular clad and a transparent core section having a higher refractive index than the transparent tubular clad, since it is usually preferred that a lot of light be sent toward the front end of the light transmission tube, a brightness on the circumferential surface area of the light transmission tube is usually not very high.

In order to increase the above brightness, it is allowable to consider the formation of some irregular convex and concave portions on the internal surface of the clad so as to improve the brightness on the circumferential surface area of the light transmission tube. However, since in use of such a light transmission tube, a light will be caused to emit from the circumferential surface area of the tube in every direction along the cross sectional plane, it is impossible to obtain a light emission having a sufficiently high brightness in a predetermined desired direction.

To cope with the above problem, it has been further suggested that a light reflective coating material is applied in a dotted or linear pattern to the outer circumferential surface of a rod member which is made of glass or a transparent resin, so as to form a light reflective layer thereon, thereby providing a light directing rod enabling a light to be emitted in a specifically determined direction. With the use of such a light directing rod, since a light is caused to be emitted in a certain specifically determined direction, a desired brightness of the light emission may be increased correspondingly. But, a problem with such a light directing rod is that if some dust or small rubbish is attached to the outer circumferential surface of the light directing rod, such dust or small rubbish will cause a deterioration in the light transmissibility of the transparent rod. As a result, a desired brightness will be decreased and/or a brightness distribution in the longitudinal direction of the transparent rod will have an undesired variation. Because of this, such a light directing transparent rod can only be used in a very clean environment free of dust or small rubbish. Moreover, the above light directing rod is manufactured by using an extrusion molding method or an injection molding method so as to produce a transparent rod, followed by printing a light reflective coating material on to the outer circumferential surface of the transparent rod. In fact, since a relatively long time is required in a subsequent drying process for drying the printed coating material, and since the whole manufacturing process has to involve at least two steps including rod formation and coating material printing, an industrial productivity is low and its manufacturing cost is high. In addition, since the above printing process is performed on a rod-like member, a desired reflective layer can only be formed on one side of the outer circumferential surface thereof, hence undesirably causing an emitted light to receive a restriction in its emitting direction.

As may be understood from the above discussion, in any of the related prior art techniques, there has not been provided a light transmission tube whose brightness may be increased by emitting a light from a circumferential surface of said tube in a specifically determined direction, which light transmission tube is capable of being used without a problem that its light emitting performance will be possibly deteriorated because of an attachment of dust or small rubbish thereto. Further, it is desired that a light transmission tube can be produced in a large amount on an industrial level with only a low cost.

OBJECT AND SUMMARY OF THE INVENTION

It is an object of the present invention to provide a light transmission tube which is capable of emitting a light from one side surface area thereof (a part of its outer surface area) with a predetermined directivity, so as to ensure a high brightness for the emitted light, thereby solving the above problems peculiar to the above-discussed prior art.

It is another object of the present invention to provide a light transmission tube which is capable of emitting a light with a high brightness in every direction.

In particular, it is a further object of the present invention to provide a light transmission tube which is capable of optionally regulating an amount of a light emitted from the outer circumferential surface of the tube.

It is a still further object of the present invention to provide a light transmission tube which is capable of being manufactured with an improved productivity and is allowed to be installed in position in a desired place with a great ease and a reduced cost.

It is one more object of the present invention to provide a light transmission tube which is capable of preventing a deterioration which is possibly caused by an ultraviolet light so that it is suitable for use in an outdoor environment.

A light transmission tube made according to a first aspect of the present invention, includes a tubular clad and a core section having a higher refractive index than that of the tubular clad, wherein a belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed.

With the light transmission tube made according to the first aspect of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like long and narrow reflecting layer. At this moment, if a light amount passing through the clad is small, a light amount reflected by the reflecting layer will also be small, hence producing only a weak reflected light. But, according to this aspect of the present invention, since it is possible to give out (emit) a strong light having a high directivity from an outer surface area of the tubular clad (which outer surface area is located opposite to one side of the tubular clad where the reflecting layer has been formed), it is sure for the light transmission tube to provide a remarkably higher brightness. For this reason, in a place equipped with thus manufactured light transmission tube, one side of the place close to a light emitting surface area of the light transmission tube will become extremely bright.

Further, if the above reflecting layer is formed of light scattering particles such as silicon resin particles, polystyrene resin particles or metal oxide particles, it is possible to effect a light emission having an extremely high brightness and a higher directivity.

Moreover, if a metal sheet or a reflective coating layer containing dispersed light scattering particles is formed on the outer surface of the clad to cover the reflecting layer formed between the clad and core section, it is allowed to remarkably reduce a possible light loss. In this way, even if there is a defect such as a pin hole formed in the reflecting layer, a light leaking through such pin hole to the back surface of the reflecting layer, or a light leaking from the lateral direction, will all be reflected by the metal sheet or the reflective coating layer, thereby ensuring a higher brightness on one side of the light transmission tube opposite to the reflecting layer side.

In detail, the clad is allowed to be a tube made of a fluorine-contained polymer, while the core section is allowed to be a solid cylindrical member made of an acrylic polymer.

In more detail, the clad may be made of a (meta)acrylic polymer, the core section may be made of a polystyrene, a polycarbonate, or a styrene-meta acryl copolymer, the reflecting layer may be made of a meta acryl polymer containing a white color pigment or a light scattering material.

A method of manufacturing a light transmission tube according to the first aspect of the present invention, comprises dispersing an amount of light scattering particles in a core section formation solution containing a monomer (which is to be polymerized to form a core section); introducing the core section formation solution containing the dispersed light scattering particles into the tubular clad; placing the tubular clad containing the core section formation solution in a horizontal position so as to cause the light scattering particles to precipitate down to a lower surface within the clad; conducting a predetermined polymerization and solidification of the core section formation solution in the clad, thereby forming a belt-like reflecting layer consisting of the light scattering particles, which is located between the tubular clad and the core section in the longitudinal direction of the tubular clad.

With the use of the above method for manufacturing a light transmission tube, it is possible to exactly form a desired belt-like reflecting layer in a simplified manner, thereby allowing an easy manufacturing of a light transmission tube having a remarkably higher brightness, capable of giving out (or emitting) a light having a high directivity from one side surface area of the light transmission tube.

In the method of manufacturing a light transmission tube according to the first aspect of the present invention, a three-material extrusion molding machine having three crew sections is used; a core formation material, a clad formation material, and a reflecting layer formation material containing a white color pigment or a light scattering material are simultaneously introduced into an inlet metal mouth adaptor on the extrusion molding machine; in a simultaneous manner, the core formation material is extruded to be formed into a solid cylindrical core member, the reflecting layer formation material is extruded into a belt-like reflecting layer formed on the outer surface of the solid cylindrical core member, the clad formation material is extruded into a tubular member covering the solid cylindrical core member and the belt-like reflecting layer, thereby forming a belt-like reflecting layer which is located between the tubular clad and the core section in the longitudinal direction thereof.

With the use of the above method, three kinds of materials having different refractive indexes and different physical properties may be extruded simultaneously so as to be formed into a laminated structure having three different functions, during only one operation. Since this method allows the laminated structure to be formed at a high speed, and since the different layers are allowed to be laminated together while they are still in a soft state, it is allowed to obtain a laminated structure having an excellent adhesion between various different layers.

Further, a reflective protection layer is allowed to be formed on the outer surface of the tubular clad to cover the reflecting layer formed between the tubular clad and the core section.

A light transmission tube made according to a second aspect of the present invention, and light transmission tubes made according to a third, fourth, fifth and sixth aspects of the present invention, are each comprised of a tubular clad and a core section having a higher refractive index than that of the tubular clad. A belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed. Particularly, a light transmission tube made according to a second aspect of the present invention, has a plurality of the reflecting layers which are so formed that a light passing through the above core section may be emitted from a side surface area of the tubular clad in a plurality of directions.

Further, in a light transmission tube made according to a second aspect of the present invention, and light transmission tubes made according to a third, fourth, fifth and sixth aspects of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like narrow reflecting layer, thus it is possible to emit a strong light having a high directivity from an outer surface area of the tubular clad (which outer surface area is located opposite to one side of the tubular clad where the reflecting layer has been formed). As a result, it is sure for the light transmission tube to provide a remarkably higher brightness, enabling a place equipped with such light transmission tube to be illuminated very brightly. In particular, since the light transmission tube made according to a second aspect of the present invention has a plurality of reflecting layers, a light is allowed to be emitted out in two or more than two directions with a good directivity.

Moreover, in a light transmission tube made according to a second aspect of the present invention, and in light transmission tubes made according to a third, fourth, fifth and sixth aspects of the present invention, the clad is allowed to be made of a meta acrylic polymer, the core section is allowed to be made of a polystyrene, a polycarbonate, or a styrene-meta acryl copolymer, the reflecting layer is allowed to be made of a meta acryl polymer containing a whit color pigment or a light scattering material.

In a method for manufacturing a light transmission tube according to a second aspect of the present invention, and light transmission tubes made according to a third, fourth, fifth and sixth aspects of the present invention, a three-material extrusion molding machine having three crew sections is used. A core formation material, a clad formation material, and a reflecting layer formation material containing a white color pigment or a light scattering material are simultaneously introduced into an inlet metal mouth adaptor on the extrusion molding machine. At the same moment, the core formation material is extruded to be formed into a solid cylindrical core member, the reflecting layer formation material is extruded into a plurality of belt-like reflecting layers formed on the outer surface of the solid cylindrical core member, the clad formation material is extruded into a tubular member covering the solid cylindrical core member and the plurality of the belt-like reflecting layers. Particularly, in a method of manufacturing a light transmission tube according to a second aspect of the present invention, a plurality of the reflecting layers is formed between the tubular clad and the core section in the longitudinal direction of the light transmission tube.

A light transmission tube made according to a third aspect of the present invention, includes a tubular clad and a core section having a higher refractive index than that of the tubular clad. In particular, a belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed. In detail, the belt-like reflecting layer is formed into a spiral configuration, thereby rendering a light passing through the above core section to be emitted spirally from side surface areas of the tubular clad.

In the light transmission tube made according to a third aspect of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like narrow reflecting layer, thus it is possible to emit a strong light having a high directivity from an outer surface area of the tubular clad (which outer surface area is located opposite to one side of the tubular clad where the reflecting layer has been formed). As a result, it is sure for the light transmission tube to provide a remarkably higher brightness, enabling a place equipped with such light transmission tube to be illuminated very brightly. In particular, since the reflecting layer has been formed into a spiral configuration, a light having a good directivity is allowed to be emitted in a spiral manner, thereby forming a light emission in every direction with a high brightness.

In a method for manufacturing a light transmission tube according to a third aspect of the present invention, a three-material extrusion molding machine having three crew sections is used. A core formation material, a clad formation material, and a reflecting layer formation material containing a white color pigment or a light scattering material are simultaneously introduced into an inlet metal mouth adaptor on the extrusion molding machine. Then, at the same moment, the core formation material is extruded to be formed into a solid cylindrical core member, the reflecting layer formation material is extruded into a plurality of belt-like reflecting layers formed on the outer surface of the solid cylindrical core member, the clad formation material is extruded into a tubular member coverring the solid cylindrical core member and the plurality of the belt-like reflecting layers. Particularly, the extruded material is twisted while being pulled out, so that the belt-like reflecting layer formed between the tubular clad and the core section extending in the longitudinal direction of the light transmission tube is formed into a spiral configuration.

A light transmission tube made according to a fourth aspect of the present invention, includes a tubular clad and a core section having a higher refractive index than that of the tubular clad. In particular, a belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed. In detail, the width of the belt-like reflecting layer is allowed to change in the longitudinal direction of the light transmission tube.

In the light transmission tube made according to a fourth aspect of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like narrow reflecting layer, thus it is possible emit a strong light having a high directivity from an outer surface area of the tubular clad (which outer surface area is located opposite to one side of the tubular clad where the reflecting layer has been formed). As a result, it is sure for the light transmission tube to provide a remarkably higher brightness, enabling a place equipped with such light transmission tube to be illuminated very brightly. In particular, since the width of the reflecting layer is allowed to be changed in the longitudinal direction of the light transmission tube, it is allowed to easily perform an adjustment of a light emitting amount on any position along the light transmission tube, by adjusting the width of the reflecting layer in the longitudinal direction thereof.

In this way, since the belt-like reflecting layer is allowed to be so formed that its width becomes gradually larger from one end (forming a light introducing position) of the light transmission tube to the other, it is sure for the light transmission tube to emit a light having an amount uniformly distributed in the longitudinal direction thereof.

In a method for manufacturing a light transmission tube according to a fourth aspect of the present invention, a three-material extrusion molding machine having three crew sections is used. A core formation material, a clad formation material, and a reflecting layer formation material containing a white color pigment or a light scattering material are simultaneously introduced into an inlet metal mouth adaptor on the extrusion molding machine. Then, at the same moment, the core formation material is extruded to be formed into a solid cylindrical core member, the reflecting layer formation material is extruded into a plurality of belt-like reflecting layers formed on the outer surface of the solid cylindrical core member, the clad formation material is extruded into a tubular member covering the solid cylindrical core member and the plurality of the belt-like reflecting layers. Particularly, the number of rotation of the extruding screw is changed so as to change an extruding amount of the reflecting layer formation material, thereby forming a belt-like reflecting layer between the tubular clad and the core section, with the width thereof being different in the longitudinal direction of the light transmission tube.

A light transmission tube made according to a fifth aspect of the present invention, includes a tubular clad and a core section having a higher refractive index than that of the tubular clad. In particular, a belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed. In detail, an outer peripheral configuration of the cross section of the tubular clad, which cross section is perpendicular to the longitudinal direction of the tubular clad, is a non-circular shape.

In the light transmission tube made according to a fifth aspect of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like narrow reflecting layer, thus it is possible to emit a strong light having a high directivity from an outer surface area of the tubular clad (which outer surface area is located opposite to one side of the tubular clad where the reflecting layer has been formed). As a result, it is sure for the light transmission tube to provide a remarkably higher brightness, enabling a place equipped with such light transmission tube to be illuminated very brightly. In particular, since an outer peripheral configuration of the cross section of the tubular clad is a non-circular shape, it is allowed to dispense with some other installing elements for installing the light transmission tube on to a predetermined surface, thereby permitting an easy installing operation. In addition, a positioning operation for correctly positioning the light transmission tube during the installing operation has become easy.

Further, with the light transmission tube made according to a fifth aspect of the present invention, the outer peripheral configuration of the cross section of the tubular clad includes at least one linear portion. For example, if it is formed into any one of the flowing shapes (i), (ii), (iii), an installing operation will become easy.

(i) the outer peripheral configuration of the cross section of the tubular clad includes at least two linear portions which are mutually perpendicular to each other.

(ii) the tubular clad has a protruding member outwardly protruding in an extending direction of a linear portion.

(iii) the tubular clad has a protruding member outwardly protruding in a direction perpendicular to the extending direction of the linear portion.

In a method for manufacturing a light transmission tube according to a fifth aspect of the present invention, a three-material extrusion molding machine having three crew sections is used. A core formation material, a clad formation material, and a reflecting layer formation material containing a white color pigment or a light scattering material are simultaneously introduced into an inlet metal mouth adaptor on the extrusion molding machine. Then, at the same moment, the core formation material is extruded to be formed into a solid cylindrical core member, the reflecting layer formation material is extruded into a belt-like reflecting layer formed on the outer surface of the solid cylindrical core member, the clad formation material is extruded into a tubular member covering the solid cylindrical core member and the plurality of the belt-like reflecting layers. Particularly, an outer peripheral configuration of the cross section of the tubular clad is a non-circular shape.

A light transmission tube made according to a sixth aspect of the present invention, includes a tubular clad and a core section having a higher refractive index than that of the tubular clad. In particular, a belt-like reflecting layer is formed between the tubular clad and the core section, extending in the longitudinal direction of the tubular clad, in a manner such that a light passing through the core section is reflected and scattered by the reflecting layer and then emitted from an outer surface area of the tubular clad, which outer surface area is located opposite to one side of the tubular clad where the reflecting layer has been formed. In detail, the tubular clad formation material contains an ultraviolet light shielding material or an ultraviolet light absorbing material.

In the light transmission tube made according to a sixth aspect of the present invention, a belt-like reflecting layer is formed between the tubular clad and the core section and extending in the longitudinal direction of the light transmission tube. Therefore, a light passing through the core section (having the largest light amount than other portions in the light transmission tube) is reflected by the belt-like narrow reflecting layer, thus it is possible to give out a strong light having a high directivity from an outer surface area of the tubular clad (which outer surface area is located opposite to one side of the tubular clad where the reflecting layer has been formed). As a result, it is sure for the light transmission tube to provide a remarkably higher brightness, enabling a place equipped with such light transmission tube to be illuminated very brightly. In particular, since the tubular clad formation material contains an ultraviolet light shielding material or an ultraviolet light absorbing material, an obtained light transmission tube has an excellent ultraviolet light resistance, so that it is suitable for use in an outdoor environment. Therefore, it has become possible to provide, with a low manufacturing cost, a light transmission tube having a simple structure without a necessity to use some other specific protection materials. For this reason, it is allowed to use a core section formation material which has only a low resistance against an ultraviolet light.

Preferably, in the light transmission tube made according a sixth aspect of the present invention, the tubular clad is made of a meta acryl polymer containing an ultraviolet light shielding material or an ultraviolet light absorbing material, the core section is made of a polystyrene, a polycarbonate, or a styrene-meta acryl copolymer, the reflecting layer is made of a meta acryl polymer containing a white color pigment or a light scattering material.

In a method for manufacturing a light transmission tube according to a sixth aspect of the present invention, a multi-material extrusion molding machine such as a three-material extrusion molding machine having three crew sections is used. A core formation material, a clad formation material, and a reflecting layer formation material containing a white color pigment or a light scattering material are simultaneously introduced into each inlet metal mouth adaptor on the three-material extrusion molding machine. Then, at the same moment, the core formation material is extruded to be formed into a solid cylindrical core member, the reflecting layer formation material is extruded into a plurality of belt-like reflecting layers formed on the outer surface of the solid cylindrical core member, the clad formation material is extruded into a tubular member covering the solid cylindrical core member and the belt-like reflecting layer. In this way, a belt-like reflecting layer is formed between the tubular clad and the core section, extending in the longitudinal direction of the light transmission tube.

BRIEF DESCRIPTION OF THE DRAWINGS

FIG. 9c is a cross sectional view taken along 9c—9c line in FIG. 9a.

FIG. 10c is a cross sectional view taken along 10c—10c line in FIG. 10a.

FIG. 10d is a cross sectional view taken along 10d—10d line in FIG. 10a.

FIG. 11b is a cross sectional view taken along 11b—11b line in FIG. 11a.

DETAILED DESCRIPTIONS OF THE PREFERRED EMBODIMENTS

The preset invention will be described in more detail in the following with reference to the accompanying drawings.

Figure 1:
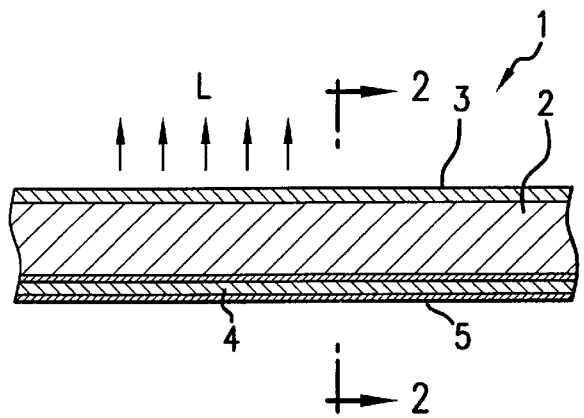
FIG. 1 is a side sectional view schematically indicating one embodiment of the present invention.
Figure 2:
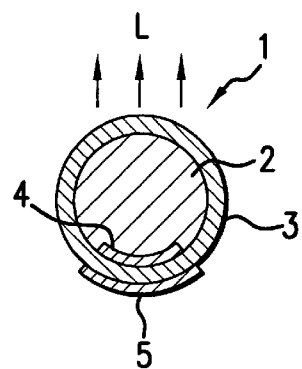
FIG. 2 is a cross sectional view taken along 2—2 line in FIG. 1.

Referring to FIGS. 1 and 2, a light transmission tube 1 made according to the present invention is comprised of a transparent tubular clad 3 and a transparent core section 2 having a higher refractive index than the transparent tubular clad 3. Further, between the inner surface on one side of the clad 3 and the core section 2, there is formed a belt-like light reflecting layer 4 extending in the longitudinal direction of the clad 3. In detail, the light reflecting layer 4 is formed on the outer surface of the core section 2 in a manner such that it invades slightly from said surface into the inner portions thereof. In this way, a light L passing through the core section 2 may be reflected by the reflecting layer 4 and is allowed to be emitted from a side surface area (an outer surface area) located opposite to the reflecting layer 4, thereby effecting a desired light emission. Moreover, if a reflective protection layer 5 is formed on the outer surface of said one side of the clad 3 to cover the reflecting layer 4, it is possible to obtain a further satisfactory effect which is expected by a user on a light transmission tube.

As a material for forming the above tubular clad 3, in a manufacturing process which will be described in detail later, it is preferred to use a plastic material or an elastomer material which has a low refractive index and but equipped with a desired flexibility so that the material itself may be easily formed into a tubular shape. For example, it is allowed to employ one or more of the following substances which may be listed to include polyethylene, polypropylene, polyamide, a polystyrene, an ABS resin, polymethyl methacrylate, polycarbonate, polyvinyl chloride, polyvinylidene chloride, polyvinyl acetate, copolymer of polyethylene and polyvinyl acetate, polyvinyl alcohol, a copolymer of polyethylene and polyvinyl alcohol, a fluorine-contained resin, a silicon resin, a natural rubber, polymer isoprene rubber, polymer butadiene rubber, a copolymer of styrene and butadiene, a butyl rubber, halogenated butyl rubber, chloroprene rubber, acryl rubber, EPDM, a copolymer of acrylonitrile and butadiene, fluorine-contained rubber, silicon rubber.

Among the above listed polymers and copolymers, it is preferred to use a silicon polymer or a flurorine-contained polymer each of which has a relatively low refractive index. In more detail, it is preferred to employ a silicon polymer such as a polydimethyl siloxane polymer, a polymethyl phenyl siloxane polymer, a fluorosilicon polymer. Further, it is also preferred to use one or more of the flowing substances which may be listed to include polytetrafluoroethylene (PTFE), a copolymer of tetraethylene and hexafluoropropylene (FEP), a copolymer of tetrafluoroethylene and perfluoroalkoxy ethylene (PFE), polychlorotrifluoroethylene (PCTFE), a copolymer of tetraethylene and an ethylene, polyvinylidene fluoride, polyvinyl fluoride, a copolymer of fluorovinylidene and trifluoroethylene chloride, a copolymer of fluorovinylidene and hexapropylene, a ternary copolymer of three sorts of tetrafluoroethylene, tetrafluoroethylene propylene rubber, a fluorine-contained thermoplastic elastomer. In particular, it is preferred to use a fluorine-contained polymer.

On the other hand, as material for forming the core section 2, it is preferred to use a solid state substance, such as an meta acrylic polymer, a polycarbonate polymer, an ethylidene norbornane polymer, ABS, an SIS, SEBS (a polymer of styrene, ethylene, butadiene and styrene block), with the meta acrylic polymer being the most favorable one.

In detail, as a (meta)acrylic polymer, it is allowed to use a homopolymer obtained by polymerizing a monomer selected from a group consisting of acrylic acid, methacrylic acid, and ester obtained by combining these monohydric alcohols. Alternatively, it is allowed to use a copolymer obtained by copolymerizing two or more monomers. Here, as monohydric alcohol, it is allowed to use a substance containing 1–22 carbon atoms. In particular, it is preferred to use a copolymer obtained by copolymerizing a) a monomer represented by the flowing general formula (1) and b) a monomer selected from a group consisting of acrylic acid, methacrylic acid, and an ester obtained by combining lower alcohol (containing 1–5 carbon atoms, preferably 1–3 carbon atoms). In this way, it is possible to obtain a suitable material for use as a core section which will have a desired softness, an excellent flexibility, and an excellent light transmissibility.

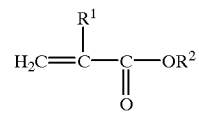

(1)

In the above general formula, $R^1$ is a hydrogen atom or a methyl group, $R^2$ is an alkyl group having 8–20 carbon atoms, preferably 10–16 carbon atoms, most preferably 12–14 carbon atoms. These higher alkyl groups may be used either singly or in combination including two or more of them, preferably it is desired to use a mixed alkyl group including an alkyl group containing 12 carbon atoms and an alkyl group containing 13 carbon atoms. At this time, a weight ratio of an alkyl group containing 12 carbon atoms to an alkyl group containing 13 carbon atoms is usually 20:80–80:20, preferably 40:60–60:40. On the other hand, a copolymerization ratio of the above monomer (selected from a group consisting of acrylic acid, methacrylic acid, and a lower alcohol ester) to a monomer represented by general formula (1) should be properly set at 50:95–79:21 by weight, preferably 30:70–65:35 by weight.

Although there is not any limitation to the diameter of the above core section 2, such a diameter should be 2–30 mm, preferably 5–15 mm.

The above reflecting layer 4 is preferred to be formed by an amount of light scattering particles capable of scattering a light. Here, as the light scatterring particles, it is allowed to use some organic polymer particles such as silicon resin particles and polystyrene resin particles, but it is also allowed to use some inorganic metal oxide particles such as $Al_2O_3$, $TiO_2$, $SiO_2$, sulfate particles such as $BaSO_4$ and carbonate particles such as $CaCO_3$. In practice, the above several kinds of particles may be used singly or in combination including two or more of them.

An average diameter of the above particles is 0.1–30 $\mu$m, preferably 1–15 $\mu$m. In a manufacturing process for producing a light transmission tube, if an average diameter of the above particles is larger than 30 $\mu$m, the particles are likely to precipitate downwardly when a liquid state material for forming the core section 2 is being introduced into the tubular clad. As a result, some undesired phenomenon will occur during the manufacturing process.

Further, although there is not any limitation to the thickness of the reflecting layer 4, such thickness is preferred to be set within a range of 10–200 $\mu$m, preferably 50–100 $\mu$m. If the thickness of the reflecting layer 4 is less than 10 $\mu$m, there will be only small amount of a reflected light, resulting in a decrease in the brightness of the light transmission tube 1. On the other hand, if the thickness of the reflecting layer 4 is more than 100 $\mu$m, there will be a large amount of a reflected light, thereby resulting in an increase in the brightness of the light transmission tube 1. However, such kind of increased brightness can be expected to occur only when the reflecting layer 4 is located not far from a light source. This means that if the reflecting layer 4 is located far from a light source, the reflecting layer 4 having a large thickness will instead cause a decrease in the brightness of the light transmission tube 1.

When using a second manufacturing method of the present invention which will be described in detail later, it is preferred that the core section 2 be formed of polystyrene, polycarbonate, or a copolymer of styrene and meta acryl. Further, the clad 3 which has a lower refractive index than the core section 2 is preferred to be formed by a meta acrylic polymer or the like. Moreover, the reflecting layer 4 is preferred to be formed by a meta acrylic polymer containing a white color pigment and a light scattering material. In detail, as a meta acrylic polymer, it is allowed to use some other substances, provided that they can serve as an equivalent to the meta acrylic polymer. As a white color pigment and a light scattering material, it is allowed to use some other substances, provided that they can serve as an equivalent to the above light scattering particles.

Where a light is likely to leak from the reflective protection layer 5, such a reflective protection layer is allowed to be so formed that it will not allow a light to pass therethrough so as to avoid the leaking of light to the outside of the light transmission tube 1. At this time, the reflective protection layer 5 is preferred to be a metal foil or metal sheet made of silver or aluminum which does not absorb a leaked light but reflects the same. Alternatively, the reflective protection layer 5 is allowed to be a coating layer throughout which are dispersed a lot of the above light scattering particles capable of scattering a light.

Figure 3:
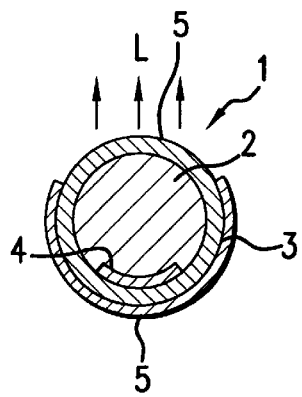
FIG. 3 is a cross sectional view similar to FIG. 2 schematically indicating another embodiment of the present invention.

As shown in FIG. 2, the reflective protection layer 5 is formed on the outer surface of the clad 3 only to cover the reflecting layer 4. Alternatively, as shown in FIG. 3, the reflective protection layer 5 may be made larger than the reflecting layer 4, and is formed on the outer surface of the clad 3 in a manner such that it extends along one side surface area of the clad 3 but with its light emitting portion exposed.

According to a first method for manufacturing the light transmission tube 1, an amount of light scattering particles is dispersed uniformly throughout a liquid material containing the above monomers. Then, the liquid material is poured into a clad tube prepared for forming the clad 3. Subsequently, both ends of the clad tube containing the liquid material are sealed, while the clad tube itself is placed in a horizontal position which is kept for about 30 minutes–48 hours, so that the particles dispersed in the liquid material are caused to precipitate. Afterwards, with the particles precipitated on the bottom layer within the liquid material, the above monomers are polymerized and then solidified, thereby obtaining a desired light transmission tube in which the reflecting layer 4 consisting of the light scattering particles is formed between the clad 3 and the core section 2. If necessary, the reflecting layer 4 may be so formed that it partially invades from the outer surface of the core section 2 into the inner portion thereof.

Although there is not any limitation to a method for polymerizing the monomers, it is usually preferred to use a method which involves the addition of a polymerization initiator and requires the polymerization to be continued for 1–20 hours at a temperature of 50–120° C. In detail, the polymerization initiator may be an organic peroxide such as a t-butylhydroperoxide, di-t-butyl peroxide, lauroyl peroxide, benzol peroxide, dimyristyl peroxy dicarbonate, t-butyl peroxy acetate, t-butyl peroxy (2-ethyl hexanolate), a cumylperoxy octate, or an azo compound such as azobisisobutyronitrile and azobiscyclohexan nitrile. Further, in order to prevent a possible formation of air bubbles in the core section 2, it is suggested that said polymerization be performed under a condition in which a pressure is applied to the liquid material for forming the core section 2 through one or both ends of the clad tube.

According to a second method for manufacturing the light transmission tube 1, a three-material extrusion molding machine having three crew sections is used, a core formation material, a clad formation material and a light reflecting material containing a white color pigment or a light scatterring particles are at the same time introduced into an inlet mouth adaptor on the three-color extrusion molding machine. In this way, at substantially the same time, the core formation material is extruded so as to be formed into a solid cylindrical core section 2, the light reflecting material is extruded so as to be formed into a belt-like reflecting layer 4 attached on the outer surface of the solid cylindrical core section 2, the clad formation material is extruded so as to be formed into a tubular member coverring the core section 2 and the reflecting layer 4, with the belt-like reflecting layer 4 located between the clad 3 and the core section 2 and arranged in the longitudinal direction thereof.

A first aspect of the present invention will be described in detail below with reference to some examples and some comparative examples. But, it is to be understood that the present invention should not be limited by these examples given in the following.

EXAMPLE 1

60 parts by weight of MMA (methyl methacrylic acid), 40 parts by weight of LMA (lauryl methacrylic acid), and 0.05 parts by weight of BPO (benzol peroxide) were mixed together to form a monomer solution (a liquid material for forming the core section 2, having a specific gravity of 0.92). Then, 0.15 parts by weight of light scatterring particles, which may be silicon resin particles (made by Toshiba Silicon Co., Ltd.) having an average particle size of 7 $\mu$m and a specific gravity of 0.92, or may be polystyrene resin particles (made by Sekisui Chemical Products Co., Ltd.) having an average particle size of 10 $\mu$m and a specific gravity of 1.06, were added into 100 parts by weight of the monomer solution. Afterwards, the monomer solution containing the light scattering particles was poured into an FEP tube having an outer diameter of 6 mm and a length of 1.5 m. Subsequently, both ends of the FEP tube were sealed up and the tube itself was kept still in a horizontal position for about 2 hours, so as to cause the above particles to precipitate downwardly to a lower area of the inner surface of the FEP tube. In practice, in order for the above precipitation process to be continued for a predetermined time period, the FEP tube was placed in a warm bath. Then, a pressure of 3.5 kg/cm$^2$ was applied through each end into the FEP tube, so as to perform the predetermined polymerization for 3 hours, thereby obtaining a solidified polymer and thus a desired light transmission tube 1.

The obtained light transmission tube 1 has a belt-like reflecting layer formed on the outer surface of the core section 2 in the longitudinal direction thereof.

Further, the brightness of the obtained light transmission tube 1 was measured by a color chrominance meter CS100, using a halogen lamp (20 W) as a light source. In fact, what was measured is a brightness of the side surface area opposite to the reflecting layer in the light transmission tube 1, with a light being introduced through one end of the tube 1. The results of the brightness measurement are indicated in the following Table 1.

As a Comparative Example 1, a monomer solution not containing the above light scattering particles was poured into an FEP tube, a similar polymerization was conducted within the FEP tube, thereby obtaining another light transmission tube. The brightness on one side surface area of this light transmission tube was measured with the use of the same measurement instrument and under the same condition as in the above Example 1, with the measurement results shown in the following Table 1.

TABLE 1

| | Dispersed Particles | Added Amount (Parts by weight) | Measurement Position (A distance from a light introducing end position on a light transmission tube) | | | |
|---|---|---|---|---|---|---|
| | | | 10 cm | 20 cm | 30 cm | 40 cm |
| Comparative Example 1 | None | 0 | 65 cd/m² | 19 cd/m² | 12 cd/m² | 11 cd/m² |
| Example 1 | Polystyrene Particles | 0.15 | 620 cd/m² | 410 cd/m² | 310 cd/m² | 205 cd/m² |
| | Silicone Particles | 0.15 | 613 cd/m² | 422 cd/m² | 380 cd/m² | 265 cd/m² |

As may be understood from the above Table 1, a light transmission tube involving the use of light scatterring particles and having a light reflecting layer formed in a proper position within the tube (Example 1), has been found to have a remarkably higher brightness on one side surface area thereof than a light transmission tube not containing the light scattering particles and without a light reflecting layer (Comparative Example 1). Further, such a brightness in Example 1 was found to be easily collectable even if a measuring point is separated from a light source (this means there is only less light distribution).

EXAMPLE 2

A light transmission tube was manufactured in the same manner as in Example 1. The brightness on one side surface area of the light transmission tube obtained in Example 2 was measured in the same manner as in Example 1, with the use of an LED red lamp as a light source (an applied voltage was 2 V, an electric current was 20 mA, an electric power was 0.04 W). The light transmission tube obtained in Example 2 was compared with another light transmission tube (Comparative Example 2) which involves the use of a light reflective tape (consisting of a polyvinyl chloride resin containing a white color pigment, the tape itself being coated with an adhesive agent) bonded on the outer surface of the clad so as to cover the reflecting layer. The results of the measurements of the two light transmission tubes are shown in the following Table 2.

It is understood from the above Table 2 that the light transmission tube obtained in Example 2 has a high brightness on one side surface area thereof, and that it is possible to obtain an improved brightness by including a light reflective tape. However, if compared with the light transmission tube obtained in the above Example 1 using a halogen lamp of 20 W, since the LED lamp used in Example 2 is only 0.04 W and thus only a small electric current is needed, the entire brightness of the light transmission tube is relatively low.

EXAMPLE 3

A three-material extrusion molding machine having three crew sections was used, which is capable of extruding at the same time a core formation material, a clad formation material and a light reflecting material. The core formation material, the clad formation material consisting of an acryl polymer, a reflecting layer formation material obtained by dispersing fifteen weight percent of titan oxide in an acryl polymer (which is the same as the acryl polymer for forming the clad), are at the same time introduced into an inlet mouth adaptor on the three-material extrusion molding machine, thereby simultaneously forming a solid cylindrical rod having a diameter of 6 mm, a belt-like white color reflecting layer having a width of 1.5 mm and a thickness of 0.01–0.02 mm (which is formed on the outer surface of the solid cylindrical rod), and a tubular clad covering the rod and the reflecting layer, thus producing a cylindrical light transmission tube. The brightness on one side surface area of the light transmission tube obtained in Example 3 was measured in the same method as in Example 1, with the measurement results shown in the following Table 3. A comparative

TABLE 2

| | Dispersed Particles | Added Amount (Parts by weight) | Measurement Position (A distance from a light introducing end position on a light transmission tube) | | |
|---|---|---|---|---|---|
| | | | 5 cm | 12 cm | 20 cm |
| Comparative Example 2 | None | 0 | 3.3 cd/m² | 1.0 cd/m² | 0.4 cd/m² |
| Example 2 | Silicone Particles | 0.5 | 10.2 cd/m² | 10.0 cd/m² | 9.6 cd/m² |
| | Silicone Particles (Light reflective tape attached) | 0.5 | 16.8 cd/m² | 16.5 cd/m² | 16 cd/m² | example shown in Table 3 is just the same as the above Comparative Examples.

TABLE 3

| | Core Section | Measurement Position (A distance from a light introducing end position on a light transmission tube) | | | |
|---|---|---|---|---|---|
| | | 10 cm | 20 cm | 30 cm | 40 cm |
| Comparative Example 3 | Acrylic Polymer | 65 cd/m² | 19 cd/m² | 12 cd/m² | 11 cd/m² |
| Example 3 | Polystyrene | 590 cd/m² | 370 cd/m² | 270 cd/m² | 180 cd/m² |
| | Polycarbonate | 510 cd/m² | 340 cd/m² | 290 cd/m² | 140 cd/m² |
| | Styrene-Acryl Copolymer | 450 cd/m² | 310 cd/m² | 200 cd/m² | 105 cd/m² |

Styrene-acryl copolymer: styrene/methylmethacrylate = 30/70 (weight ratio)

Styrene-acryl copolymer: styrene/methylmethacrylate= 30/70 (weight ratio)

EXAMPLE 4

A light transmission tube was manufactured in the same manner as in the above Example 3. The brightness of one side surface area of the light transmission tube obtained in Example 2 was measured in the same manner as in Example 1, with the use of an LED red lamp as a light source (an applied voltage was 2 V, an electric current was 20 mA, an electric power was 0.04 W). The measurement results are shown in the following Table 4.

TABLE 4

| | Core Section | Measurement Position (A distance from a light introducing end position on a light transmission tube) | | |
|---|---|---|---|---|
| | | 5 cm | 12 cm | 20 cm |
| Comparative Example 4 | Acrylic Polymer | 3.3 cd/m² | 1.0 cd/m² | 0.4 cd/m² |
| Example 4 | Polystyrene | 9.7 cd/m² | 9.0 cd/m² | 8.5 cd/m² |
| | Polycarbonate | 9.2 cd/m² | 8.6 cd/m² | 8.1 cd/m² |
| | Styrene-Acryl Copolymer | 8.6 cd/m² | 7.8 cd/m² | 7.5 cd/m² |

EXAMPLE 5

A light transmission tube obtained in the above Example 3 was used in Example 5. At first, an observation was carried out to know whether or not air has entered between various layers in the light transmission tube. Then, a quenching treatment (quick cooling) was performed to cause the temperature to drop rapidly from 70° C. to −30° C. Subsequently, a quick heating process called heat shock was conducted so as to cause the temperature to rise rapidly from −30° C. to 70° C. After that, another observation was conducted to know whether or not a peeling-off phenomenon has occurred between various layers within the light transmission tube. In practice, the above observations were all performed by introducing a light into the light transmission tube.

As a result, at the times before and after the above heat shock treatment, no air was found in any one of the light transmission tubes obtained in the above Examples, nor was found any peeling phenomenon between various layers thereof, thereby making it possible to ensure an excellent tight adhesion between these layers within each of the light transmission tubes.

Figure 4:
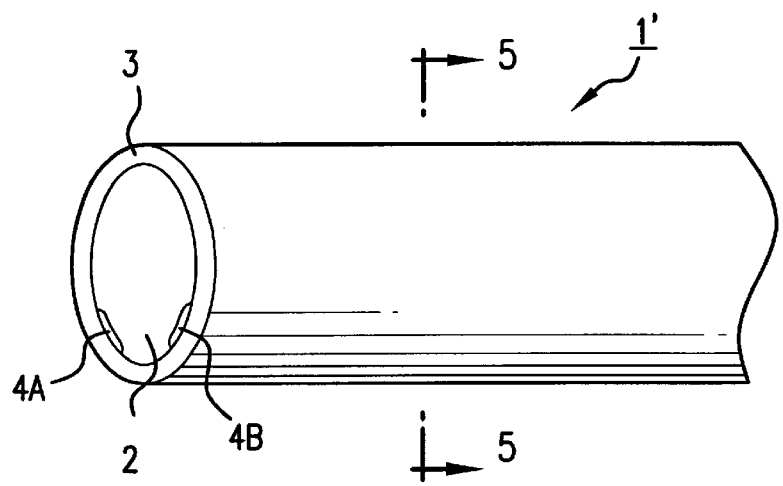
FIG. 4 is a perspective view schematically indicating one embodiment of a light transmission tube made according to the present invention.
Figure 5:
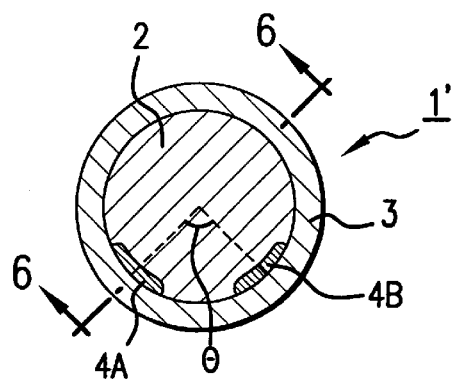
FIG. 5 is a cross sectional view taken along 5—5 line in FIG. 4.
Figure 6:
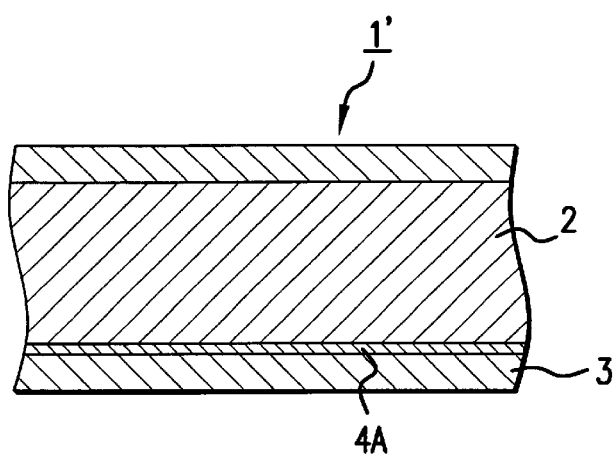
FIG. 6 is a side sectional view taken along 6—6 line in FIG. 5.

FIG. 4 is a perspective view schematically indicating a light transmission tube made according to a second aspect of the present invention. FIG. 5 is a cross sectional view taken along line 5—5 line on the tube shown in FIG. 4. FIG. 6 is a longitudinally sectional view taken along 6—6 line on the tube shown in FIG. 5. FIGS. 7a–7d are cross sectional views each schematically indicating an example of a reflecting layer formed within a light transmission tube.

Light transmission tubes 1', 1A, 1B, 1C shown in FIGS. 4–7d are each comprised of a core section 2, a tubular clad 3 covering the the core section 2, two belt-like reflecting layers 4A, 4B provided between the core section 2 and the tubular clad 3, extending in the longitudinal direction of each light transmission tube. In particular, such reflecting layers 4A and 4B may also be formed to invade slightly into the inner portion of the core section 2.

A material forming the core section 2 (a core formation material) is preferred to be a transparent material having a higher refractive index than a material forming the clad 3 (a clad formation material). In general, the core formation material should be selected properly from various sorts of plastics and elastomers, in view of a specific purpose.

In detail, a material suitable for use in forming the core section 2 may be a transparent material such as polystyrene, a copolymer of styrene and methyl methacrylate, a meta acryl resin, polymethyl pentene, an arylglycol carbonate resin, a spiran resin, amorphous polyolefin, polycarbonate, polyamide, polyarylate, polysulfone, polyaryl sulfone, polyether sulfone, polyether imide, a polyimide, a diaryl phthalate, a fluorine-contained resin, a polyester carbonate, a norbornane resin (ARTON), an alicyclic acryl resin, a silicon resin, acryl rubber, and silicon rubber. Here, the meta acryl is used to mean acryl and methacryl.

On the other hand, a material suitable for use in forming the clad should be a transparent material having a relatively low refractive index, and may be selected from various organic materials such as a plastic and an elastomer.

In detail, a material for forming the clad may be polyethylene, polypropylene, polymethyl methacrylate, fluoropolymethyl methacrylate, polyvinyl chloride, polyvinylidene, polyvinyl acetate, a copolymer of polyethylene and polyvinyl acetate, polyvinyl alcohol, a copolymer of polyethylene and polyvinyl alcohol, a fluorine-contained resin, a silicon resin, natural rubber, a polyisoprene rubber, polybutadiene rubber, a copolymer of styrene and a butadiene, butyl rubber, halogenated butyl rubber, chloroprene rubber, aryl rubber, a copolymer of ethylene and propylene and diene (EPDM), a copolymer of acrylnitrile and butadiene, fluorine-contained rubber, and silicon rubber.

In order to ensure some desired optical properties including a desired transparency and a desired refractive index for a clad and a core section and to ensure a high efficiency in simultaneously extrusion molding these members, a material for forming the core section is preferred to be polystyrene, polycarbonate, or a copolymer of styrene and meta acryl (MS polymer). On the other hand, a material for forming the clad is preferred to be an meta acrylic polymer.

A white color pigment material and a light scatterring material may be a sort of organic polymer particles such as silicon resin particles and styrene resin particles, a kind of metal oxide particles such as $Al_2O_3$ particles, $Ti_2O_3$ particles, $SiO_2$ particles, a kind of sulfate particles such as $BaSO_4$ particles, a kind of carbonate particles such as CaCO₃ particles, all of which may be used singly or in combination including two or more of them.

When it is required to ensure a sufficient reflecting efficiency and to improve an operational efficiency in the above-described simultaneous extrusion, an average size of the white color pigment particles and the light scattering particles should be 1–200 μm, preferably 0.5–50 μm. Further, each of their contents to be contained in a material for forming the reflecting layer is 0.5–20 wt %, preferably 1–10 wt %.

Although there is not any limitation to the thickness of the reflecting layers 4A and 4B, such a thickness should be 10–200 μm, preferably 50–100 μm. If the thickness is less than 10 μm, there will be only small amount of reflected light and hence a brightness will be low. On the other hand, if the thickness is more than 200 μm, a brightness will be high. But, such a high brightness can be obtained only when a brightness measuring point is not far from a light source. Moreover, if a brightness measuring point is relatively far from a light source, a large thickness of the reflecting layers will instead bring about a decrease in the brightness.

In addition, although there is no limitation to the diameter of the core section 2, such a diameter should be 2–30 mm, preferably 5–15 mm. Further, the thickness of the tubular clad 3 is 0.05–4 mm, preferably 0.2–2 mm.

Although there are no limitations to the number of the belt-like reflecting layers, the positions for the formation thereof, the width of the belt-like configuration, and the interval between the two belt-like layers, it is required that a plurality of reflecting layers be formed in a manner such that each of the lights reflected by the reflecting layers has a predetermined directivity.

Figure 7A:
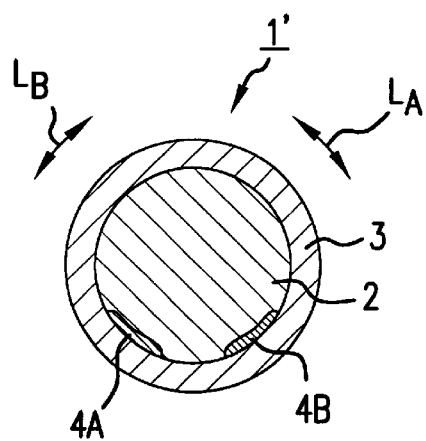
FIGS. 7a, 7b, 7c and 7d are cross sectional views schematically indicating several examples of the formation of several different reflecting layers.
Figure 7B:
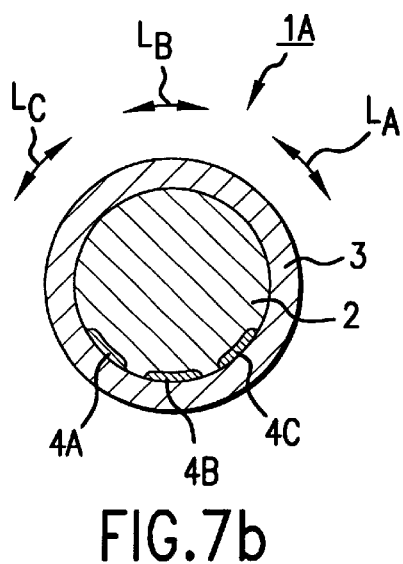
Figure 7C:
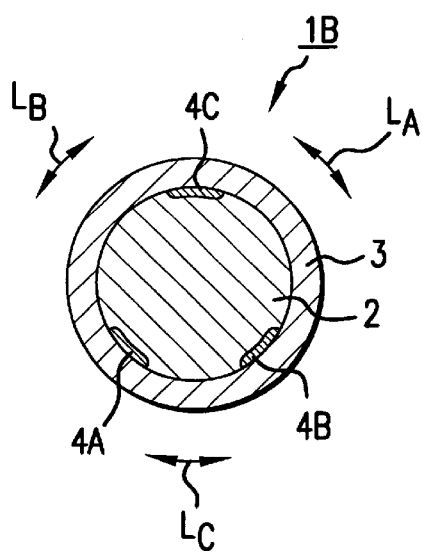

If it is a light transmission tube 1' having two reflecting layers 4A and 4B formed within the tube in a manner as shown in FIG. 7a, it is possible to obtain two reflected lights having two reflecting areas LA and LB, thereby it is possible for each reflected light to have a good directivity and a high brightness. Further, if it is a light transmission tube 1' having three reflecting layers 4A and 4B and 4c formed within the tube in a manner as shown in FIG. 7c, it is possible to obtain three reflected lights involving three reflecting areas LA and LB and LC, thereby it is possible for each reflected light to have a good directivity and a high brightness.

Although each of the reflecting layers is required to have a width (in the circumferential direction) which is about 3–30% of the circumference of the core section 2, preferably such a percentage is 5–20%. In fact, said percentage is also allowed to be out of the range 3–30%.

Figure 7D:
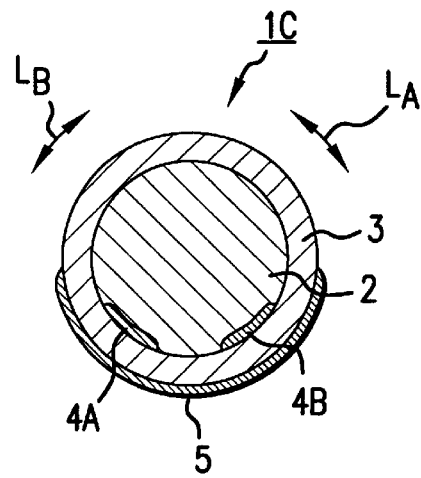

Referring to FIG. 7d, a light transmission tube 1C is allowed to have a reflective protection layer 5 formed on the outer surface of the tubular clad 3 so as to cover the reflecting layers 4A and 4B. In this manner, even if there are some defects such as pin holes formed on the reflecting layers 4A and 4B, a light possibly leaked through such defect portions arriving at the back surface of the reflecting layers 4A and 4B and a light possibly leaked from the side portions of the reflecting layers 4A and 4B will all be reflected by the reflective protection layer 5, thereby making it sure to reduce a possible light loss and thus ensuring a high brightness on the side surface areas of the tube 1C opposite to the reflecting layers 4A and 4B.

As a material for forming the reflective protection material 5, it is preferred to use a substance which does not allow a light leaked through the reflecting layers 4A, 4B and 4C to pass therethrough to the outside of the light transmission tube, will not absorb a leaked light but will reflect the same with a high efficiency. In detail, it is allowed to employ a metal foil or a metal sheet made of silver or aluminium. Alternatively, it is allowed to form such a reflective protection layer 5 by coating a part of the outer surface of the clad 3 with a coating material which contains an amount of light scattering particles dispersed therein so as to obtain a light scattering property. Although the reflective protection layer 5 is required to be provided only in an area capable of covering the reflecting layers 4A, 4B and 4C, in fact it is also allowed to be formed on other areas on the outer surface of the tubular clad 3, provided that such a reflective protection layer 5 does not cover up the light emitting portions (some areas of the outer surface of the tubular clad 3 corresponding to light reflecting areas $L_A$, $L_B$ and $L_C$) of the light transmission tube.

In a process for manufacturing the light transmission tube, a multi-material such as a three-material extrusion molding machine having three crew sections was used, a core formation material, a clad formation material and a light reflecting material containing a white color pigment or a light scattering particles are simultaneously introduced into an inlet mouth adaptor on the three-material extrusion molding machine. In this way, at substantially the same time, the core formation material is extruded to be formed into a solid cylindrical core section, the light reflecting material is extruded to be formed into a plurality of belt-like reflecting layers attached on the outer surface of the solid cylindrical core section, the clad formation material is extruded to be formed into a tubular member covering the core section and the reflecting layers.

With the use of the above method, the three different materials having different refractive indexes and different physical properties may be extruded at the same time, thereby obtaining a laminated structure having three different functions in only one operation. Further, since this method allows formation of the laminated structure at a relatively high speed, and since various material layers can be laminated together while they are still in a soft state, it is sure to efficiently manufacture a light transmission tube having an excellent tight adhesion between various layers laminated together. On the other hand, if it is required that the reflecting layer formation material be divided to be formed into a plurality of belt-like reflecting layers, it is allowable to use a plurality of inlet metal mouth adaptors on the extrusion molding machine so as to simultaneously receive a plurality of different reflecting layer formation materials. Alternatively, it is also possible to use only one inlet metal mouth adaptor which has been divided into several smaller spaces by several partition walls, such that several different reflecting layer formation materials may be simultaneously received in said one inlet mouth adaptor.

In a process for forming the above reflective protection layer 5, a metal foil or a metal sheet is allowed to be formed on an extruded product so as to form such a reflective protection layer. Alternatively, such a reflective protection layer may be formed by applying a coating material containing light scatterring particles dispersed in the coating material. In this way, such a reflective protection layer may be formed at the same time when the above tubular clad is being formed.

Nevertheless, the light transmission tube of the present invention may also be manufactured with the use of some other methods than the above described methods.

Comparative Examples 5–7

What was used as an extrusion molding machine is a multi-material extrusion molding machine having three crew sections, which is capable of simultaneously extruding a core formation material, a clad formation material and a light reflecting material (a reflecting layer formation material). In detail, a core formation material, a clad formation material consisting of an acryl polymer, and a reflecting layer formation material obtained by dispersing 15 wt % of $TiO_2$ (having an average size of 10 μm) in an acryl polymer (which is the same as the acryl polymer for forming the clad), were simultaneously introduced into an inlet mouth adaptor on the extrusion molding machine, thereby simultaneously forming a solid cylindrical rod (serving as a core section) having a diameter of 6 mm, a belt-like white reflecting layer having a width of 1.5 mm and a thickness of 0.01–0.02 mm formed on the outer surface of the rod, a tubular clad coverring the rod and the reflecting layer, thus obtaining a cylindrical light transmission tube having an outer diameter of 6.5 mm.

Then, a light was introduced into the light transmission tube through one end thereof, and a brightness on the side surface area located opposite to the reflecting layer was measured with the use of a color chrominance (CS 100), with the measurement results shown in the following Table 5. In this measurement, a light source was a green color LED (light emitting diode) (an applied electric current: 20 MA, a light emitting amount: 1 lumen).

Comparative Example 8

A monomer solution consisting of methyl methacrylic acid, lauryl methacrylic acid and benzol peroxide, was poured into FEP (a copolymer of tetraethylene and hexafluoro propylene) having an outer diameter of 6 mm and a length of 25 m. Then, the FEP tube was placed into a warm bath of 65° C., a pressure of 3.5 kg/cm² was continuously applied into the tube through either end thereof so as to perform a predetermined polymerization for 3 hours, followed by a solidification. In this way, it was able to obtain a light transmission tube having an outer diameter of 6.5 mm and a length of 20 m, without forming a reflecting layer between the core section and the FEP tubular clad. The brightness on the side surface area of the obtained light transmission tube was measured in the same manner as described in the above, with the measurement results shown in the following Table 5.

TABLE 5

| Comparative Examples | Core Section Formation Material | Brightness (cd/m²) Measurement Position (A distance from a light introducing end position on a light transmission tube) | | |
|---|---|---|---|---|
| | | 5 cm | 12 cm | 20 cm |
| 5 | Polystyrene | 9.7 | 9.0 | 8.5 |
| 6 | Polycarbonate | 9.2 | 8.6 | 8.1 |
| 7 | Styrene-Acryl Copolymer | 8.6 | 7.8 | 7.5 |
| 8 | Acrylic Polymer | 3.3 | 1.0 | 0.4 |

As can be understood from the above Table 5, if a reflecting layer is formed between the core section and the tubular clad, it is possible to further increase a brightness on a predetermined side surface area of a light transmission tube.

EXAMPLE 6

This example was conducted in the same manner as in Comparative Example 5, except that two outlet metal mouth adaptors were provided for extruding a reflecting layer formation material so as to extrude two elongated reflecting layers each having a width of 2 mm with an angle of 80 degrees formed therebetween (as shown in FIG. 7, two normal lines passing through the reflecting layers 4A and 4B and extending in the radial directions of the light transmission tube forms an intersection angle of 80 degree). Therefore, it was able to obtain a light transmission tube according to a further aspect of the present invention. Then, in the same manner as described in Comparative Examples 5–7, a light was introduced into the obtained light transmission tube, an angle distribution of an emitted light on the predetermined side surface area thereof was measured under a condition where said side surface area was 50 cm separated from a light introducing position, with the measurement results shown in FIG. 8.

Figure 8A:
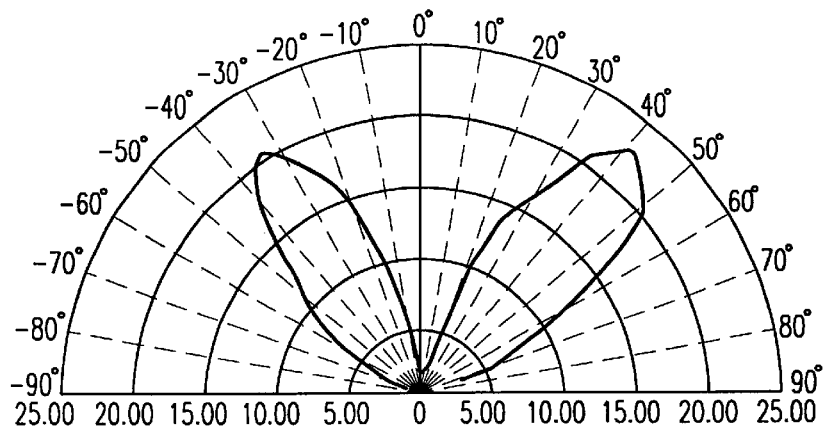
FIGS. 8a, 8b and 8c are graphs indicating angle analyzing results of emitted lights from light transmission tubes made in several Examples and Comparative Examples.
Figure 8B:
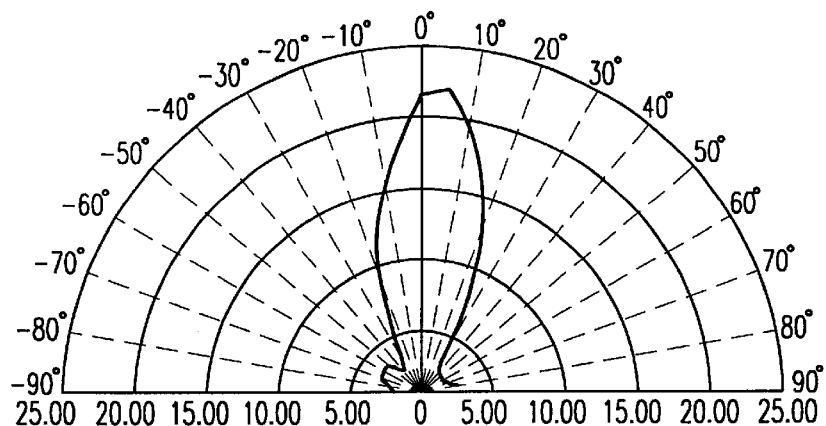

As to a light transmission tube obtained in the above Comparative Example 5, the same measurement was conducted in the same manner as described in the above Example 6, so as to investigate an angle distribution of an emitted light, with the measurement results shown in FIG. 8b.

Comparative Example 9

This comparative example was substantially the same as the above Comparative Example 5 except that an outlet metal mouth adaptor was enlarged so as to extrude a reflecting layer having a width of about 3 mm, thereby producing a light transmission tube. The angle distribution of an emitted light was investigated in the same manner as in the above Example 6, with the measurement results shown in FIG. 8c.

Figure 8C:
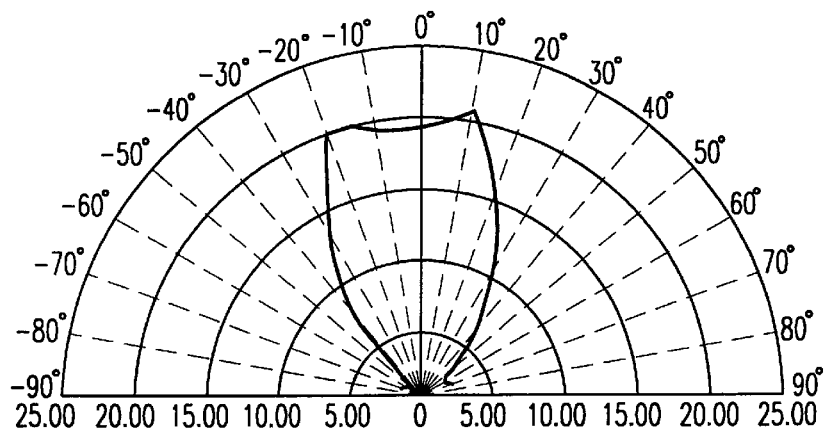

As shown in FIGS. 8a–8c, according to the present invention, the formation of one or more reflecting layers is useful to obtain a light having a high directivity. Therefore, with the use of the present invention, if a plurality of reflecting layers is formed in the manner as described above, it is possible to obtain a plurality of emitted lights each having a higher directivity. Thus, as may be deduced from the above description, in accordance with the present invention, it is allowed to freely change an angle distribution (a light directivity) of an emitted light by changing the width of each reflecting layer and the number of the reflecting layers.

Accordingly, with a light transmission tube made according to the second aspect of the present invention, it is allowed to emit a plurality of light rays each having a high directivity from predetermined side surface areas of the light transmission tube, thereby effectively increasing a desired brightness.

Figure 9A:
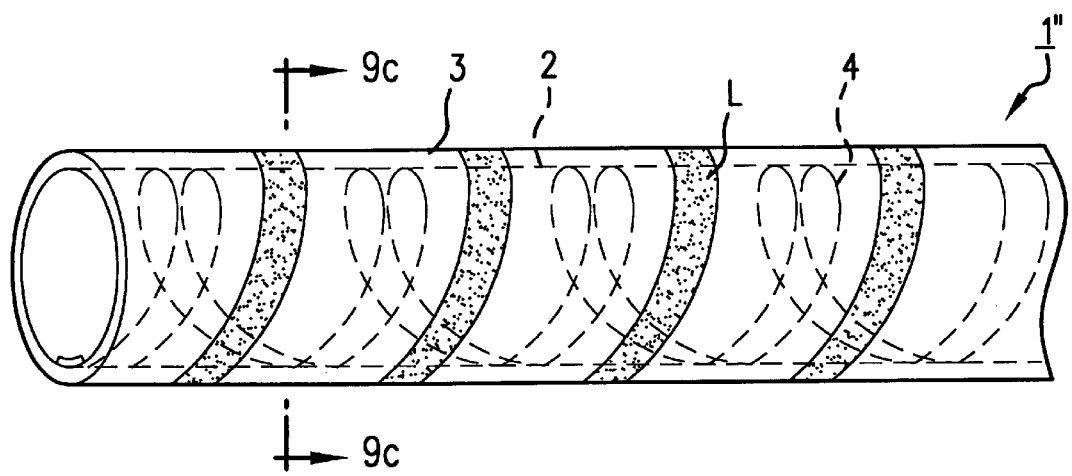
FIG. 9a is a perspective view schematically indicating an embodiment of a light transmission tube made according to the present invention.
Figure 9B:
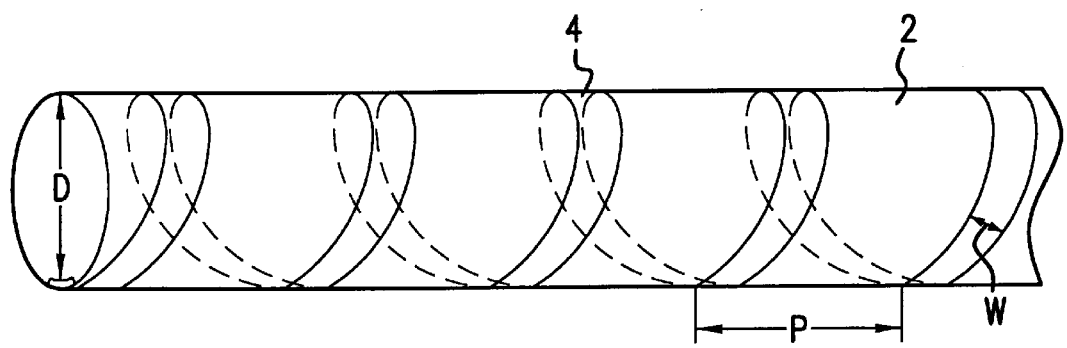
FIG. 9b is a perspective view schematically indicating a light transmission tube without illustrating a tubular clad.
Figure 9C:
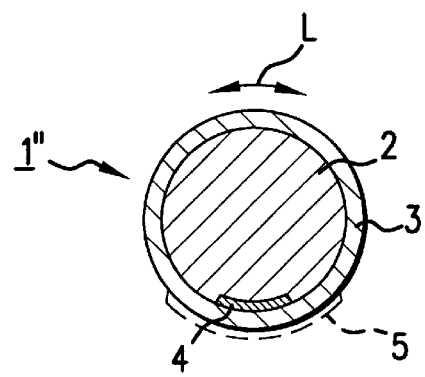

FIG. 9a is a perspective view schematically indicating one embodiment of a light transmission tube made according to a third aspect of the present invention. FIG. 9b is a perspective view schematically indicating an arrangement where a tubular clad has not been illustrated. FIG. 9c is a cross sectional view taken along line 9c—9c in FIG. 9a.

As shown in FIGS. 9a–9c, a light transmission tube 1" has a core section 2, a tubular clad 3 covering the core section 2, and a belt-like reflecting layer 4 wound spirally around the core section 2 so as to be located between said core section 2 and the tubular clad 3 in the longitudinal direction of the tube 1". Further, it is also possible that the reflecting layer may be allowed to slightly invade from the surface of the core section 2 into the internal portions thereof.

In this comparative example, a core formation material for forming the core section 2, a reflecting layer formation material for forming the reflecting layer 4, a clad formation material for forming the clad 3 are just the same as those in the second aspect of the present invention. Further, the thickness of the reflecting layer 4 and the diameter of the core section 2 are also the same as those in the second aspect of the present invention.

In practice, there is no limitation to the thickness of the reflecting layer 4, the formation position of the belt-like reflecting layer 4 which is formed in a spiral manner, the width of the belt-like reflecting layer 4, and a pitch of the spirally formed belt-like reflecting layer 4. What was necessary is only that the reflecting layer 4 be formed so that each light reflected from the reflecting layer has a good directivity, thereby forming some spiral light rays to be emitted outwardly in a desired manner.

As shown in FIG. 9a, if it is a light transmission tube 1" having a reflecting layer 4 formed in a spiral manner, it is sure to obtain a reflected light having a good directivity and a high brightness, both in a spirally formed area L indicated by dotted lines in FIG. 9a, and in an area L shown in FIG. 9c.

A pitch of spirally formed belt-like reflecting layer 4 (shown by a capital letter P in FIG. 9b) will be different depending on the width of the belt-like reflecting layer 4 (shown by a capital letter W in FIG. 9b), also depending on the diameter of the core section 2 (shown by a capital letter D). If the pitch P is too small, an emitted light will be blocked by the reflecting layer 4 itself, hence making it difficult to obtain a desired emitted light. On the other hand, if the pitch P is too large, a reflected light will become sparse, resulting in a problem that it will be impossible to obtain an emitted light uniformly distributed in every direction and having a high brightness. Usually, the pitch P of a spirally formed belt-like reflecting layer 4 is 0.1–10 times relative to the diameter of the core section 2, while the width W of the reflecting layer 4 is 3–50% of the circumference of the core section 2, preferably 5–20%.

Further, it is also allowed to form a reflective protection layer 5 on the outer surface of the tubular clad 3 in a manner such that the reflecting layer 4 may be covered, as shown in FIG. 9c.

A method for forming the reflective protection layer 5 and its formation area are just the same as described in the second aspect of the present invention.

In a process for manufacturing the light transmission tube shown in FIGS. 9A–9C, it is required to use a multi-material extrusion molding machine such as a three-material extrusion molding machine having three crew sections. A core formation material, a clad formation material, and a reflecting layer formation material containing a white color pigment or a light scatterring material are introduced into the extrusion molding machine. In this way, at exactly the same time, the core formation material is extruded to be formed into a solid cylindrical core member, the reflecting layer formation material is extruded into a belt-like layer so as to be formed on the outer surface of the solid cylindrical core member, the clad formation material is extruded into a tubular member covering the solid cylindrical core member and the belt-like reflecting layer. At this moment, in order to obtain the spirally formed reflecting layer with a predetermined pitch, a necessary treatment was that the extruded material still in its soft state be twisted properly while being pulled out.

In fact, the spirally formed belt-like reflecting layer does not have to be formed into only one elongated element, it is also allowed to form a plurality of such spiral belt-like reflecting layers. When it is desired to form a plurality of spiral belt-like reflecting layers, it is suggested that a reflecting layer formation material be so extruded that it is divided into a plurality of belt-like narrow layers. In practice, as a method for forming a plurality of spiral belt-like reflecting layers, it is allowed to provide several inlet metal mouth adaptors to be able to receive several batches of reflecting layer formation materials. Alternatively, it is also possible that several partition walls (each having a thickness corresponding to an interval between two reflecting layers) may be provided within only one inlet metal mouth adaptor so as to receive several batches of reflecting layer formation materials.

EXAMPLE 7

Example 7 is almost the same as the above Comparative Example 5, except that an outlet metal mouth adaptor for extruding the reflecting layer formation material has been changed in its width and that at the same time the extruded material is twisted while being pulled out, so as to form a spirally arranged belt-like reflecting layer having a width of about 1 mm and a pitch of about 6.5 mm, thereby obtaining a light transmission tube of the present invention. Then, in the same manner as described in Comparative Example 5, a light was introduced into the light transmission tube, a brightness on one side surface area of the light transmission tube was measured. It was found that since a spiral light is formed to be emitted outwardly, such a light may be emitted out in every direction, thereby obtaining a brightness having the same level as in the above Comparative Example 5.

In this way, with the use of the light transmission tube made according to the third aspect of the present invention, it is sure to spirally emit a light having a good directivity from the side surface area of the light transmission tube, thereby effectively increasing its brightness.

Figure 10A:
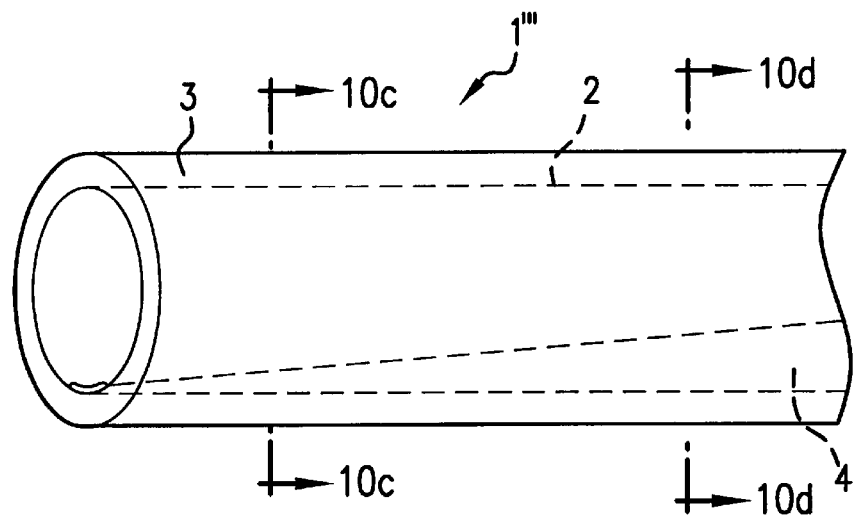
FIG. 10a is a perspective view schematically indicating an embodiment of a light transmission tube made according to the present invention.
Figure 10B:
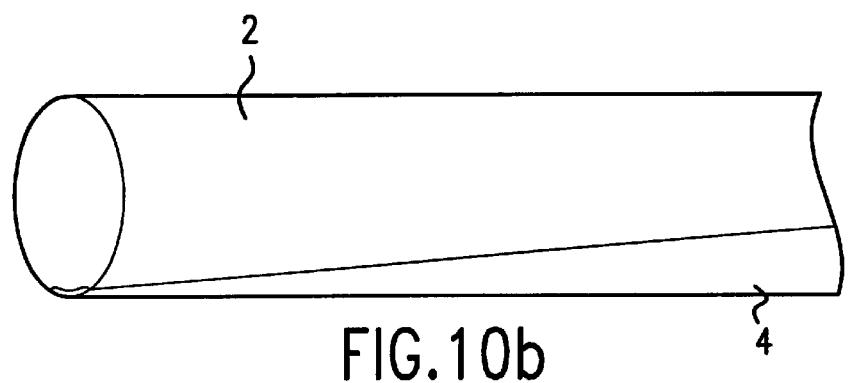
FIG. 10b is a perspective view schematically indicating a light transmission tube without illustrating a tubular clad.
Figures 10C, 10D:
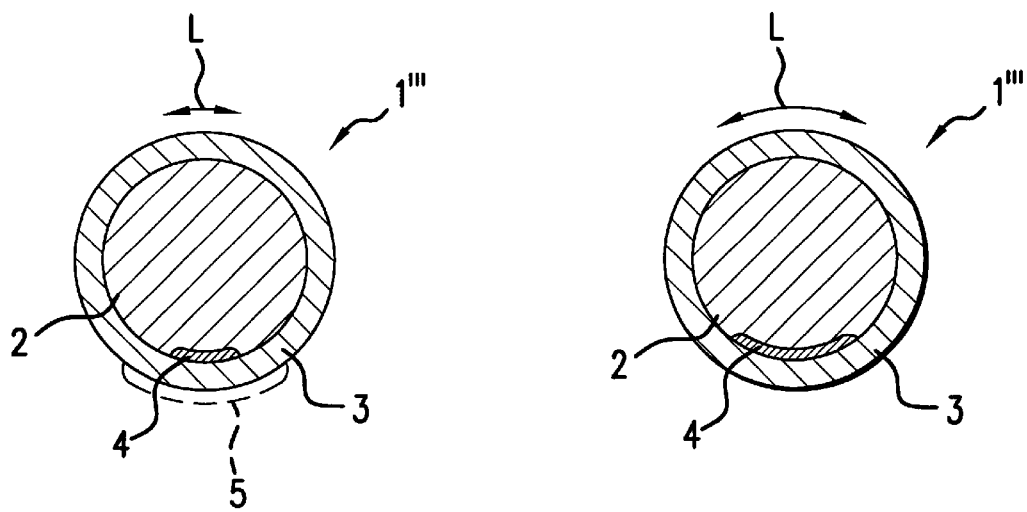

FIG. 10a is a perspective view schematically indicating another embodiment of a light transmission tube made according to a fourth aspect of the present invention. FIG. 10b is also a perspective view schematically indicating a light transmission tube with its tubular clad being omitted. FIG. 10c is a cross sectional view taken along line 10c—10c in FIG. 10a. FIG. 10d is also a cross sectional view taken along a line 10d—10d in FIG. 10a.

A light transmission tube 1''' shown in FIGS. 10a–10d, has a core section 2, a tubular clad 3 covering the core section 2, a belt-like reflecting layer 4 extending in the longitudinal direction of the tube and having a changing width in said longitudinal direction (in this example, the belt-like reflecting layer 4 has a width which becomes larger gradually from one end of the light transmission tube toward the other). On the other hand, it is also possible that such a reflecting layer 4 is allowed to partially invade into the inner portion of the core section 2.

In this example, a core formation material for forming the core section 2, a reflecting layer formation material for forming the reflecting layer 4, a clad formation material for forming the clad 3 are just the same as those in the second aspect of the present invention. Further, the thickness of the reflecting layer 4 and the diameter of the core section 2 are also the same as those in the second aspect of the invention.

In the present invention, there is no limitation to the formation position of the belt-like reflecting layer 4 and the width of the reflecting layer 4. What was necessary is only that lights reflected by the reflecting layer are emitted out as a plurality of light rays each having a good directivity.

As shown in FIGS. 10a–10d, if it is a light transmission tube 1''' whose belt-like reflecting layer 4 has a width which becomes larger gradually from one end of the light transmission tube toward the other, a light introduced into the tube through one end thereof is reflected by the reflecting layer 4 and then emitted out from the side surface area of the tube, resulting in a situation that the light amount in the core section 2 will become less gradually from one end of the tube toward the other. For this reason, if the reflecting layer 4 is made to have a relatively larger width so as to obtain a larger reflectance, it is possible to emit a light uniformly distributed in the longitudinal direction of the light transmission tube.

On the other hand, although the width (in the circumferential direction of the light transmissible tube) of the reflecting layer 4 is caused to vary in a range that is 3–50% of the circumference of the core section 2, preferably 5–20%, it is also possible that such a percentage may be larger or smaller beyond such a range.

Further, in the present invention, the width of the reflecting layer is allowed to vary contineously, but it is also allowed to vary from step to step.

As shown in FIG. 10c, it is also possible to form a reflective protection layer 5 on the outer surface of the tubular clad 3 so as to cover the reflecting layer 4.

A method for forming the reflective protection layer 5 and its formation area are allowed to be the same as the above second aspect of the present invention.

In a process for manufacturing the light transmission tube shown in FIGS. 10a–10d, it is required to use a multi-material extrusion molding machine such as a three-material extrusion molding machine having three crew sections. A core formation material, a clad formation material, and a reflecting layer formation material containing a white color pigment or a light scatterring material are introduced into the extrusion molding machine. In this way, at exactly the same time, the core formation material is extruded to be formed into a solid cylindrical core member, the reflecting layer formation material is extruded into a belt-like layer so as to be formed on the outer surface of the solid cylindrical core member, the clad formation material is extruded into a tubular member coverring the solid cylindrical core member and the belt-like reflecting layer. At this moment, the number of the rotation of the extruding screw may be changed so as to change the extruding amount of the reflecting layer formation material, thereby extruding a belt-like reflecting layer 4 in a position between the core section 2 and the tubular clad 3, with the thickness of the belt-like reflecting layer 4 varying in the longitudinal direction of the light transmission tube.

In addition, the reflecting layer does not necessarily have to be formed into only one belt-like element. In fact, it is also possible to form a plurality of such belt-like reflecting layers. When it is desired to form a plurality of spiral belt-like reflecting layers, it is suggested that a reflecting layer formation material be so extruded that it is divided into a plurality of belt-like layers. In practice, as a method for forming a plurality of spiral belt-like reflecting layers, it is allowed to provide several inlet metal mouth adaptors so as to be able to receive several batches of reflecting layer formation materials. Alternatively, it is also possible that several partition walls (each having a thickness corresponding to an interval between two reflecting layers) may be provided within only one inlet metal mouth adaptor so as to receive several batches of reflecting layer formation materials.

EXAMPLE 8

This example is almost the same as the above Comparative Example 5, except that the number of the rotation of an extruding screw for extruding the reflecting layer formation material was varied continuously, and the extruding operation was performed in a manner such that the width of the reflecting layer will change from 3 mm to 0.2 mm extending along a length of 30 cm. In this way, a light transmission tube according to a further embodiment of the present invention was produced. The produced light transmission tube was cut so as to obtain a tube section having a length of 30 cm. It was found that the width of the reflecting layer becomes gradually large from 0.2 mm to 3 mm extending from one end to the other on the light transmission tube.

Then, in the same manner as described in the above Comparative Example 5, a light is introduced through one end of the light transmission tube at which the width of the reflecting layer is 0.2 mm, thereby measuring the brightness on a side surface area of the light transmission tube, with the measurement results shown in the following Table 6.

A light transmission tube made in the above Comparative Example 5 is cut so as to obtain a tube section having a length of 30 cm, thereby measuring the brightness on a side surface area of the light transmission tube, with the measurement results shown in the following Table 6.

TABLE 6

| | Brightness ($cd/m^2$) Measurement Position (A distance from a light introducing end position on a light transmission tube) | | |
|---|---|---|---|
| | 5 cm | 12 cm | 20 cm |
| Example 8 | 8.9 | 9.0 | 9.1 |
| Comparative Example 5 | 9.7 | 9.0 | 8.5 |

As may be understood in the above Table 6, with the use of the present invention, it is sure to provide a light transmission tube having a uniformly distributed brightness on side surface area thereof.

Therefore, with the use of the fourth aspect of the present invention, it is sure to emit a light having a good directivity from the side surface area of the light transmission tube, thereby effectively increasing the brightness thereof. Moreover, by changing the width of a reflecting layer, it is allowed to optionally change the brightness on the side surface area of the light transmission tube.

Further, according to the fourth aspect of the present invention, it is sure to provide a light transmission tube having a uniformly distributed brightness on the side surface area thereof.

Figure 11A:
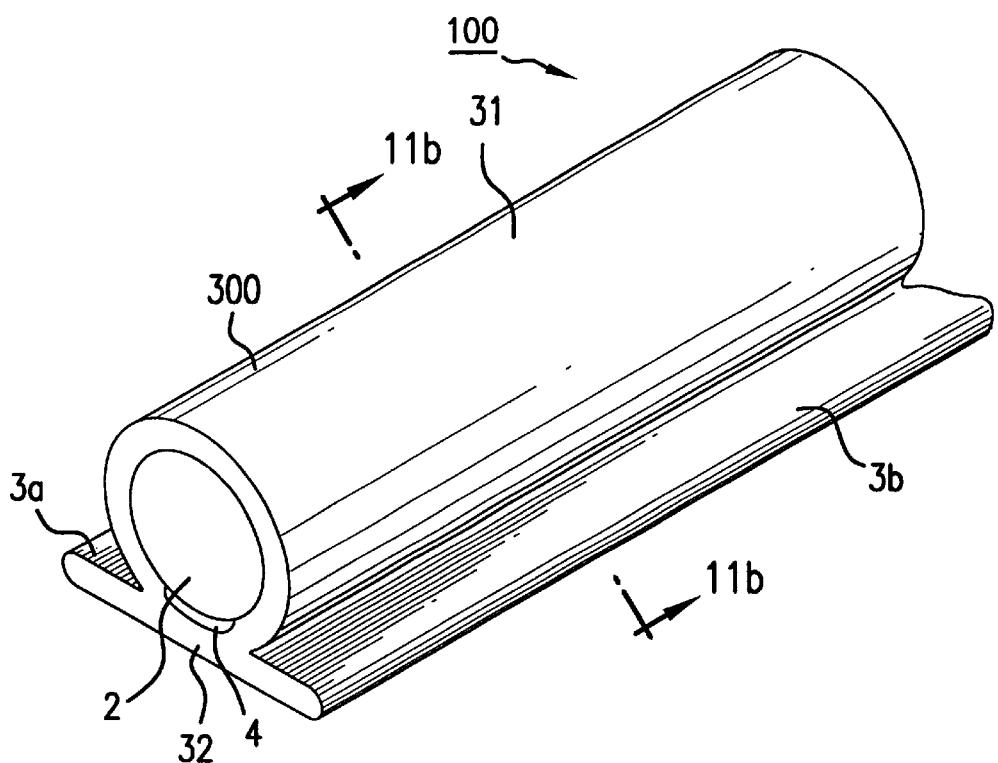
FIG. 11a is a perspective view schematically indicating an embodiment of a light transmission tube made according to the present invention.
Figure 11B:
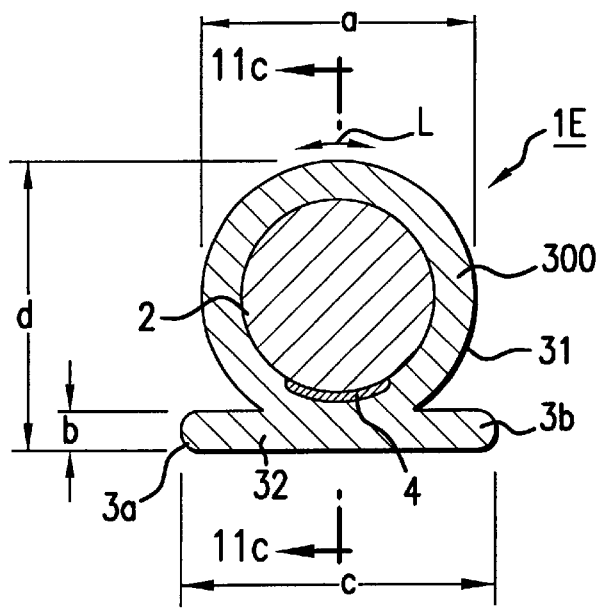
Figure 11C:
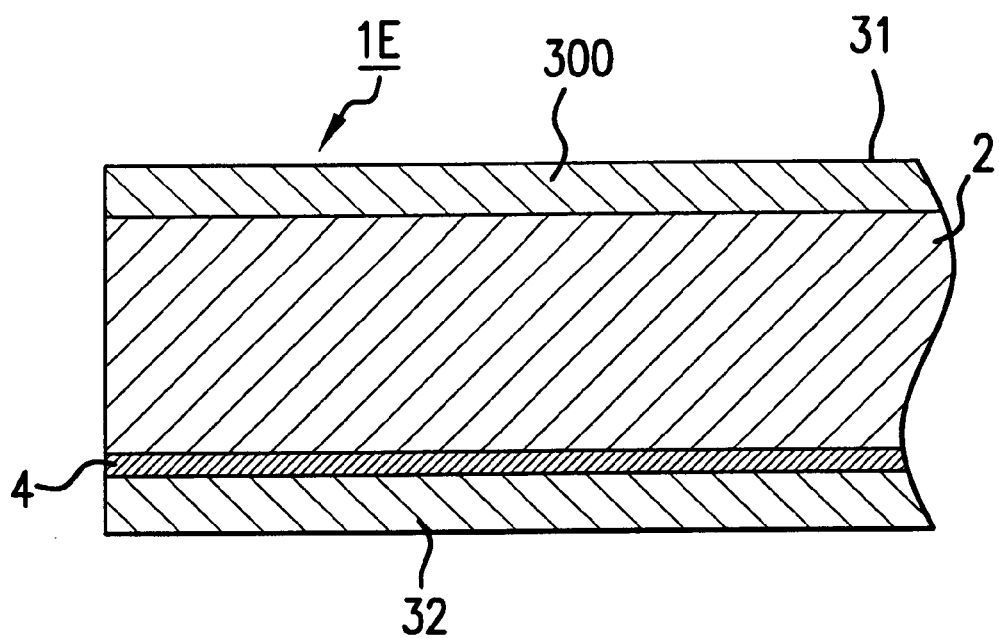
FIG. 11c is a side sectional view taken along 11c—11c line in FIG. 11b.

FIG. 11a is a perspective view schematically indicating an embodiment of a light transmission tube made according to a fifth aspect of the present invention. FIG. 11b is a cross sectional view taken along line 11b—11b line in FIG. 11a. FIG. 11c is a longitudinally sectional view taken along line 11c—11c line in FIG. 11b. FIGS. 12a–12f are all cross sectional views schematically indicating some other embodiments of a light transmission tube made according to the fifth aspect of the present invention.

As shown in FIGS. 11a–11c, a light transmission tube 100 has a core section 2, a tubular clad 300 coverring the core section 2, and a belt-like reflecting layer 4 winding spirally around core section 2 so as to be located between said core section 2 and the tubular clad 300 in the longitudinal direction of the tube 100. Further, it is also possible that the reflecting layer may be allowed to slightly invade from the surface of the core section 2 into the internal portions thereof.

The tubular clad 300 has a cross section which includes a ring-shaped portion 31 and a straight linear portion 32, thereby forming a flange portion 3a and a flange portion 3b extending in the longitudinal direction of the light transmission tube on one side of the clad 300. However, the reflecting layer 4 is provided on one side on the inner surface of the clad 300 in a manner such that it is located near the straight linear portion 32.

In practice, the straight linear portion 32 of the light transmission tube 100 is attached to and fixed on a predetermined surface with the use of an adhesive agent or a pressure sensitive adhesive double coated tape. Moreover, if necessary, screws may be used to fix both the flange portions 3a and 3b onto a predetermined surface. In this way, the light transmission tube is allowed to be installed on a predetermined position without using some specifically formed installing elements, thereby avoiding a problem that an emitted light will be undesirably blocked by the installing elements. In addition, since a light reflecting area L which, effected by the reflecting layer 4, has a good directivity and a relatively high brightness, is exactly located on a position opposite to the straight linear portion 32, a desired positioning operation will become extremely easy.

Other embodiments indicating various shapes of a tubular clad will be described with reference to FIGS. 12a–12f.

Figure 12A:
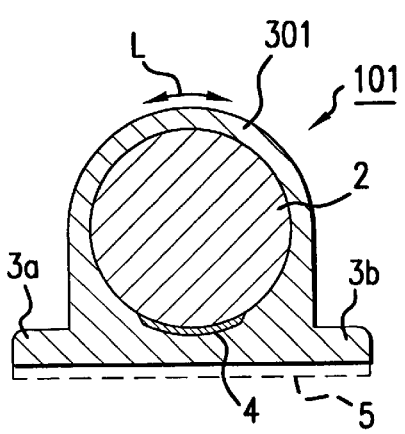
FIGS. 12a–12f are cross sectional views schematically indicating several embodiments of several types of light transmission tubes made according to the present invention.
Figure 12B:
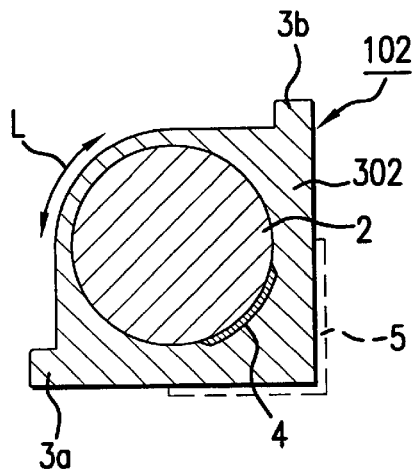
Figure 12C:
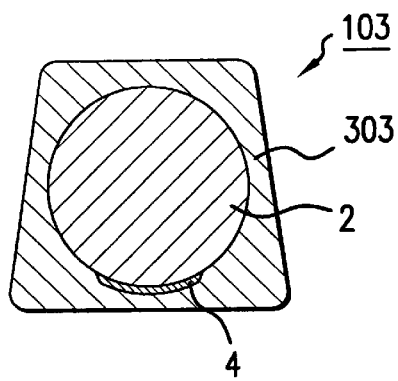
Figure 12D:
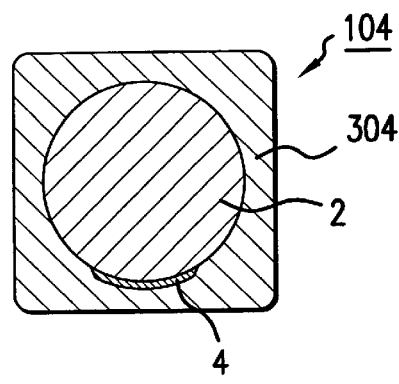
Figure 12E:
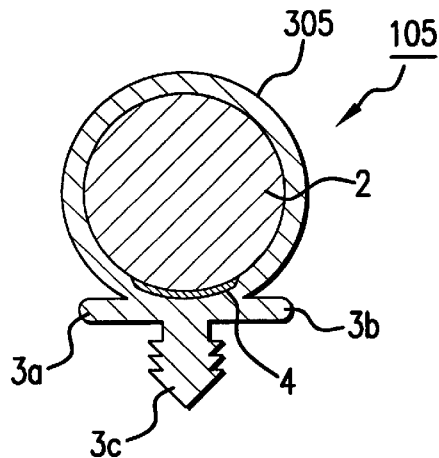
Figure 12F:
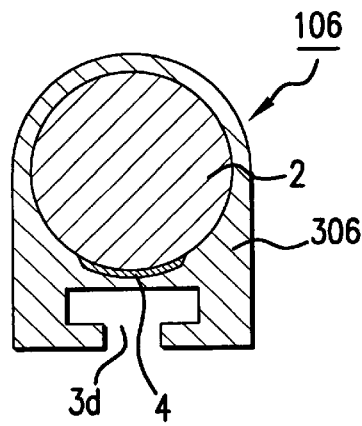

FIG. 12a is a cross sectional view schematically indicating a light transmission tube 101 having a tubular clad 301 which includes a generally ring-shaped portion and a plate-like linear portion and is further formed with a flange portion 3a and a flange portion 3b. FIG. 12b is also a cross sectional view schematically indicating a light transmission tube 102 having a tubular clad 302 which includes a ring-shaped portion and a square portion and is further formed with a flange portion 3a and a flange portion 3b. FIGS. 12c and 12d are also cross sectional views schematically indicating light transmission tubes 103 and 104 having tubular clads 303 and 304, each of which presents a trapezoidal cross section or a generally square cross section. FIG. 12e is also a cross sectional view schematically indicating a light transmission tube 105 which has a tubular clad 305 including a ring-shaped portion and a linear portion, and is further formed on one side of its outer surface with a protruding portion perpendicular to the linear portion. FIG. 12f is also a cross sectional view schematically indicating a light transmission tube 106 having a tubular clad 306 including a recess portion formed on the linear portion thereof.

With each of the above illustrated light transmission tubes 101–106 having the tubular clads 301–306, and with the light transmission tube 100 which was described earlier in the present specification, a light reflecting layer 4 has always been described to be located on a position adjacent to a linear portion. However, it is also possible that such a reflecting layer 4 may be located on a position other than the above-described position. Moreover, it is also allowed to provide two or more such reflecting layers.

In this example, a core formation material for forming the core section 2, a reflecting layer formation material for forming the reflecting layer 4, a clad formation material for forming the clad 3 are just the same as those in the second aspect of the present invention. Further, the thickness of the reflecting layer 4 and the diameter of the core section 2 are also the same as those in the second aspect of the invention.

On the other hand, although the width (in the circumferential direction of the light transmissible tube) of the reflecting layer 4 is set to vary in a range that is 3–50% of the circumference of the core section 2, preferably 5–20%, it is also possible that such a percentage may be larger or smaller beyond the above range.

As shown by broken lines in FIGS. 12a and 12b, it is also possible to form a reflective protection layer 5 on the outer surface of the tubular clad 3 so as to cover the reflecting layer 4.

A method for forming the reflective protection layer 5 and its formation area are allowed to be the same as the above second aspect of the present invention.

In a process for manufacturing the light transmission tube, it is required to use a multi-material extrusion molding machine such as a three-material extrusion molding machine having three crew sections. A core formation material, a clad formation material, and a reflecting layer formation material containing a white color pigment or a light scatterring material are introduced into the extrusion molding machine. In this way, at exactly the same time, the core formation material is extruded to be formed into a solid cylindrical core member, the reflecting layer formation material is extruded into a belt-like layer so as to be formed on the outer surface of the solid cylindrical core member, the clad formation material is extruded into a tubular member covering the solid cylindrical core member and the belt-like reflecting layer, thereby obtaining a tubular light transmission device having a desired non-circular cross section.

With the use of this method, it is possible to form a tubular clad whose cross section may be formed into any desired shape.

In addition, the reflecting layer, as described in the above, may be formed into a plurality of such belt-like reflecting layers. When it is desired to form a plurality of spiral belt-like reflecting layers, it is suggested that a reflecting layer formation material be so extruded that it is divided into a plurality of belt-like layers. In practice, as a method for forming a plurality of spiral belt-like reflecting layers, it is allowed to provide several inlet metal mouth adaptors so as to receive several batches of reflecting layer formation materials. Alternatively, it is also possible that several partition walls (each having a thickness corresponding to an interval between two reflecting layers) may be provided within only one inlet metal mouth adaptor so as to receive several batches of reflecting layer formation materials.

EXAMPLE 9

This example is almost the same as the above Comparative Example 5, except that an extruding outlet metal mouth adaptor (for extruding a clad formation material) was changed so as to extrude a tubular clad in a manner as shown in FIGS. 11a–11c, thereby producing a desired light transmission tube. The sizes of various portions of a tubular member are shown by a, b, c, and d in FIG. 11b, as a=6.5 mm, b=1 mm, c=8 mm, d=7 mm.

Then, the light transmission tube was measured in its brightness on a side surface area thereof in the same manner as described in the above Comparative Example 5, thereby obtaining exactly the same results as measured in Comparative Example 5. During such a measurement, while the light transmission tube was fixed on a predetermined table with the use of a pressure sensitive adhesive double coated tape, such a fixing operation was completed within a time period of only 10 seconds, thereby rendering it possible to dispense with some troublesome adjustments for positioning the light transmission tube, and permitting a complete omission of the use of some installing elements.

In contrast, with a light transmission tube prepared in the above Comparative Example 5, some Ω-shaped installing elements were needed in fixing the light transmission tube onto a predetermined table. Further, during a positioning operation, the light transmission tube was positioned in a manner such that a light is allowed to be emitted in a vertical direction when observed by a naked eye under a light-emitted condition. A fixing operation for fixing the light transmission tube onto a predetermined table was completed in five minutes. In addition, some areas in which some installing elements were attached were found to be a failure in emitting a desired light.

As may be understood from the above measurement results, the light transmission tubes made in the above examples of the present invention are easy to be manufactured and easy to be installed on to a predetermined surface.

In this way, with the use of the light transmission tube made according to the fifth aspect of the present invention, it is sure to emit a light having a good directivity from a side surface area of the tube, and to effectively increase the brightness thereof. Further, the light transmission tube made according to the fifth aspect of the present invention is easy to be positioned onto a predetermined position and thus allow an increased efficiency in installing the light transmission tube with the use of only fewer installing elements, thereby permitting the installing operation to be accomplished in a short time with a reduced cost.

Further, it is possible for the clad formation material to contain the following materials for use as an ultraviolet light shielding material or an ultraviolet light absorbing material. These materials may be an organic compound such as a salicylic acid, benzophenone, benzotriazol, cyano-crylate. Alternatively, these materials to be included in the clad may be a metal oxide such as titan oxide ($TiO_2$), zinc oxide (ZnO), silicon oxide ($SiO_2$), aluminium oxide ($Al_2O_3$), or a carbonate compound such as calcium oxide ($CaCO_3$).

If a mixing amount of an ultraviolet light shielding material or an ultraviolet light absorbing material is too small, it will be impossible to obtain a sufficient ultraviolet resistance. On the other hand, if a mixing amount of an ultraviolet light shielding material or an ultraviolet light absorbing material is too large, there is a possibility that a desired tubular clad having a predetermined shape will be difficult to obtain. For the above-discussed reason, it is preferred that an amount of an ultraviolet light shielding material or an ultraviolet light absorbing material to be included in the clad formation material is 0.1–1 wt %.

EXAMPLE 10

This example is almost the same as the above Comparative Example 5, except that a clad formation material was prepared with the use of a methacryl polymer containing 0.1 wt % of an ultraviolet light absorbing material which is 2-(2'-hydroxy-5'-methylphenel) benzotriazole, thereby obtaining a light transmission tube of the present invention in the same manner as described in the above Comparative Example 5.

The obtained light transmission tube was cut so as to obtain a tube section having a length of 30 cm. Then, a test of an ultraviolet light irradiation was conducted for 200 hours with the use of "Super UV Tester" (manufactured by Iwasaki Electric Co., Ltd.).

The brightness on the side surface area of the light transmission tube (before and after the test of an ultraviolet light irradiation) was measured in the same manner as described in the above Comparative Example 5, with the measurement results shown in the following Table 7.

Comparative Example 10

The brightness on the side surface area of the light transmission tube made in the above Comparative Example 5 was measured (before and after the test of an ultraviolet light irradiation) in the same manner as described in the above Example 10, with the measurement results shown in Table 7.

TABLE 7

| | | Brightness ($cd/m^2$) Measurement Position (A distance from a light introducing end position on a light transmission tube) | | |
|---|---|---|---|---|
| | Ultraviolet Irradiation | 5 cm | 12 cm | 20 cm |
| Example 10 | Before Ultraviolet Irradiation | 9.7 | 9.0 | 8.5 |
| | After Ultraviolet Irradiation | 6.5 | 5.7 | 5.2 |
| Comparative Example 10 | Before Ultraviolet Irradiation | 9.7 | 9.0 | 8.5 |
| | After Ultraviolet Irradiation | 9.0 | 8.2 | 7.7 |

As may be understood from Table 7, if a clad formation material contains an ultraviolet light absorbing material, an obtained light transmission tube will have an excellent ultraviolet light resistance. Therefore, such a light transmission tube made according to the present invention is suitable for use in an outdoor environment without a necessity to use some other protection materials, thus ensuring a satisfactory long term use with a good performance thereof.

What is claimed is:

1. A light transmission tube including a tubular clad and a core section having a higher refractive index than that of the tubular clad, wherein a belt-like reflecting layer is formed between the tubular clad and the core section, extending in a longitudinal direction of the tubular clad, in a manner such that a light passing through the core section is reflected and scattered by a reflecting layer and then emitted from an outer surface area of the tubular clad, which outer surface area is located opposite to one side of the tubular clad where the reflecting layer has been formed.

2. The tube according to claim 1, wherein a reflecting layer consisting of light scatterring particles is formed between the tubular clad and the core section.

3. The tube according to claim 1, wherein a reflective protection layer is formed on an outer surface of the tubular clad to cover the reflecting layer formed between the tubular clad and the core section.

4. The tube according to claim 1, wherein a cross section perpendicular to a longitudinal direction of the tube is one of a circular shape and an oval shape.

5. The tube according to claim 1, wherein the clad is a tube made of a fluorine-contained polymer, the core section is made of an acrylic polymer.

6. The tube according to claim 1, wherein the clad is made of a meta acrylic polymer, the core section is made of a polystyrene, a polycarbonate, or a styrene-meta acryl copolymer, the reflecting layer is made of a meta acryl polymer containing a white color pigment or a light scatterring material.

7. The light transmission tube according to claim 1, wherein a plurality of belt-like reflecting layers is formed, a light passing through the core section is caused to emit from side surface areas of the tubular clad in a plurality of directions.

8. The light transmission tube according to claim 1, wherein the belt-like reflecting layer is formed into a spiral configuration, so that a light passing through the core section is caused to emit from side surface areas of the tubular clad in a spiral manner.

9. A light transmission tube according to claim 1, wherein the width of the belt-like reflecting layer varies so as to be different along the longitudinal direction.

10. A light transmission tube according to claim 9, wherein the belt-like reflecting layer is so formed that its width becomes gradually larger from one end of the light transmission tube serving as a light introducing position to an opposite end thereof, thereby ensuring a light emission from the light transmission tube with an emitted light amount being uniformly distributed in the longitudinal direction thereof.

11. The light transmission tube according to claim 1, wherein an outer peripheral configuration of a cross section of the tubular clad, which cross section is perpendicular to the longitudinal direction of the tubular clad, is a non-circular shape.

12. The light transmission tube according to claim 11, wherein the outer peripheral configuration of the cross section of the tubular clad includes at least one linear portion.

13. The light transmission tube according to claim 12, wherein the outer peripheral configuration of the cross section of the tubular clad includes at least two linear portions which are mutually perpendicular to each other.

14. The light transmission tube according to claim 12, wherein the tubular clad has a protruding member outwardly protruding in an extending direction of the linear portion.

15. The light transmission tube according to claim 12, wherein a tubular clad has a protruding member outwardly protruding in a direction perpendicular to the extending direction of the linear portion.

16. The light transmission tube according to claim 1, wherein the tubular clad formation material contains an ultraviolet light shielding material or an ultraviolet light absorbing material.

17. The light transmission tube according to claim 16, wherein the tubular clad is made of a meta acryl polymer containing the ultraviolet light shielding material or the ultraviolet light absorbing material, the core section is made of polystyrene, polycarbonate, or styrene-meta acryl copolymer, the reflecting layer is made of a meta acryl polymer containing a white color pigment or a light scattering material.

* * * * *